(12) United States Patent
Martin et al.

(10) Patent No.: US 11,719,830 B2
(45) Date of Patent: Aug. 8, 2023

(54) RTK VECTOR PHASE LOCKED LOOP ARCHITECTURE

(71) Applicants: Deere & Company, Moline, IL (US); Auburn University c/o Office of Innovation Advancement and Commercialization, Auburn, AL (US)

(72) Inventors: Scott M. Martin, Auburn, AL (US); David M. Bevly, Auburn, AL (US); Richard G. Keegan, Palos Verdes Estates, CA (US); Stephen F. Rounds, San Clemente, CA (US)

(73) Assignees: Deere & Company, Moline, IL (US); Auburn University c/o Office of Innovation Advancement and Commercialization, Auburn, AL (US)

( * ) Notice: Subject to any disclaimer, the term of this patent is extended or adjusted under 35 U.S.C. 154(b) by 405 days.

(21) Appl. No.: 17/222,418

(22) Filed: Apr. 5, 2021

(65) Prior Publication Data
US 2021/0311206 A1 Oct. 7, 2021

Related U.S. Application Data

(63) Continuation of application No. 16/157,934, filed on Oct. 11, 2018, now Pat. No. 10,969,496.
(Continued)

(51) Int. Cl.
*G01S 19/44* (2010.01)
*G01S 19/41* (2010.01)
(Continued)

(52) U.S. Cl.
CPC ............ *G01S 19/44* (2013.01); *G01S 19/256* (2013.01); *G01S 19/41* (2013.01); *G01S 19/423* (2013.01); *G01S 19/43* (2013.01); *G01S 19/51* (2013.01)

(58) Field of Classification Search
CPC .......... G01S 19/44; G01S 19/41; G01S 19/43; G01S 19/51; G01S 19/256; G01S 19/423
(Continued)

(56) References Cited

U.S. PATENT DOCUMENTS

| 6,434,462 B1 | 8/2002 | Bevly et al. |
| 6,681,180 B2 | 1/2004 | Bevly et al. |

(Continued)

FOREIGN PATENT DOCUMENTS

WO    WO 2009/125011 A1    10/2009

OTHER PUBLICATIONS

Martin, International Search Report and Written Opinion, PCT/US2017/058296, dated Jun. 28, 2018, 11 pgs.
(Continued)

*Primary Examiner* — Harry K Liu
(74) *Attorney, Agent, or Firm* — Morgan, Lewis & Bockius LLP

(57) ABSTRACT

A navigation system for a mobile object generates navigation data for the mobile object based on satellite navigation signals received from a plurality of satellites and base data received from a stationary base station. The navigation data includes code phase estimates and carrier phase estimates for the plurality of satellites. The system computes position, velocity and time estimates for the mobile object in accordance with the code phase estimates and carrier phase estimates, and performs a navigation function for the mobile object in accordance with the position, velocity and time estimates. The system generates code phase estimates by performing a Vector Delay Locked Loop (VDLL) computation process that drives a code NCO for each channel of a plurality of channels, and generates carrier phase estimates for the plurality of satellites by performing a RTK Vector (Continued)

Phase Locked Loop computation process that drives a carrier NCO for each channel.

32 Claims, 13 Drawing Sheets

Related U.S. Application Data

(60) Provisional application No. 62/576,044, filed on Oct. 23, 2017.

(51) Int. Cl.
　　*G01S 19/51*　　(2010.01)
　　*G01S 19/42*　　(2010.01)
　　*G01S 19/43*　　(2010.01)
　　*G01S 19/25*　　(2010.01)

(58) Field of Classification Search
　　USPC .................................................. 342/357.27
　　See application file for complete search history.

(56) References Cited

U.S. PATENT DOCUMENTS

| | | | |
|---|---|---|---|
| 6,732,024 B2 | 5/2004 | Wilhelm Rekow et al. | |
| 10,534,087 B1 | 1/2020 | Brewer et al. | |
| 2017/0219715 A1* | 8/2017 | Ashjaee | G01S 19/41 |

OTHER PUBLICATIONS

Deere & Company, International Preliminary Report on Patentability, PCT/US2017/058296, dated Apr. 28, 2020, 7 pgs.

Non-Final Office Action, U.S. Appl. No. 16/157,934, dated Jul. 8, 2020, 4 pgs.

Brewer, James et al., "Differential vector phase locked loop" IEEE Transactions on Aerospace and Electronic Systems, IEEE Service Center, Piscataway, U.S., vol. 52, No. 3, Jun. 1, 2016, pp. 1046-4055.

Brewer, "The Differential Vector Phase-Locked Loop for Global Navigation Satellite System Signal Tracking", AFIT Dissertation presented Jun. 2014, pp. 1-125, p. 33, paragraph III-p. 96, paragraph IV.

Chen et al., "Implementation and Performance Analysis of an Adaptive Vector Tracking Loop Utilizing Precise Satellite Orbit/Clock and Ionospheric Products", Proceedings of the 28th International Technical Meeting of the ION Satellite Division of the Institute of Navigation, Sep. 2015, pp. 1175, paragraph 3-1177, paragraph 4, 7 pgs.

Giger et al., "Joint Satellite Code and Carrier Tracking", ITM 2010, Proceedings of the 2010 International Technical Meeting of the Institute of Navigation, Jan. 27, 2010, pp. 636-645, p. 637, paragraph 2-p. 640, abstract.

Martin, Notice of Allowance, U.S. Appl. No. 16/157,934, dated Nov. 30, 2020, 7 pgs.

Martin, Notice of Allowance, U.S. Appl. No. 16/157,934, dated Feb. 10, 2021, 2 pgs.

\* cited by examiner

586 Estimate an initial position of the mobile object relative to the stationary base station using a scalar phase locked loop (PLL) filter

Figure 5H

Calculate an initial position of the mobile object relative to the stationary base station using a Real-Time-Kinematics (RTK) algorithm 572 Receive code phase estimates and carrier phase estimates from the plurality of channels 574 In accordance with the position-related information of the stationary base station and the received code phase estimates and carrier phase estimates, estimate the initial position of the mobile object relative to the stationary base station.

576 Calculate a vector of fixed integer single difference carrier ambiguities

570

580 Estimate an initial relative velocity and an initial relative clock state using the Kalman Filter 586 Estimate an initial position of the mobile object relative to the stationary base station using a scalar phase locked loop (PLL) filter

Figure 5I

RTK VECTOR PHASE LOCKED LOOP ARCHITECTURE

RELATED APPLICATIONS

This application is a continuation of U.S. patent application Ser. No. 16/157,934, filed Oct. 11, 2018, which claims priority to U.S. Provisional Patent Application Ser. No. 62/576,044, filed Oct. 23, 2017, which is hereby incorporated by reference in its entirety.

TECHNICAL DATA FIELD

The disclosed embodiments relate generally to satellite communications. More particularly, the disclosed embodiments relate to satellite signal tracking in degraded signal environments.

BACKGROUND

Receivers in global navigation satellite systems, such as Global Positioning System (GPS), use range measurements that are based on line-of-sight signals from satellites. The signal strength received by the GPS receivers is weak, approximately $10^{-16}$ watts, and therefore susceptible to interference caused by a variety of environmental factors including natural obstructions (e.g., trees, canyons), man-made physical obstructions (e.g., building, bridges), and electromagnetic (e.g., signal jammers) interference. These reliability factors, along with accuracy limitations, are the primary concerns that limit the adoption of GPS in markets like the booming commercial autonomous vehicle industry.

A common approach to reducing effects of atmospheric error and satellite clock errors on position accuracy of a mobile rover receiver is to compare the mobile rover receiver measurements to measurements from a stationary base receiver using a technique called differential GPS (DGPS). The base receiver is mounted at a known location on a structure with a clear view of the sky near the area (within several kilometers) where the mobile rover receiver is to operate. Real time kinematic (RTK) GPS solution is a DGPS solution based on carrier phase measurement. High precision RTK GPS receivers require continuous carrier phase lock on multiple satellite signals by the mobile rover and the stationary base receiver. Traditional scalar tracking RTK GPS receivers normally maintain phase lock on several signals in environments where the mobile rover receiver has a clear line of sight to the sky, and where the received signal is not disrupted by interference due to atmospheric effects or signal jammers. Applications such as precision surveying in heavy foliage, and autonomous vehicle operation in urban canyons strain the capabilities of a scalar tracking receiver.

SUMMARY

To address reliability and accuracy concerns, a vector tracking receiver architecture is developed for improved code and carrier tracking in environments that disrupt the operations of a traditional scalar RTK GPS receiver. The receiver combines a Doppler-aided Vector Delay Locked Loop (VDLL) navigation processor with a novel RTK-Vector Phase Locked Loop (RTK-VPLL) navigation processor. The carrier tracking algorithms of the vector tracking receiver use measurements from a base antenna and a relative position vector to predict the received signal from each satellite. When measurements are available at the receiver, the relative position vector estimates are updated. In the vector receiver, the local replicas are driven by a global navigation solution directly. The combined Doppler-aided VDLL and RTK-VPLL receiver architecture mitigates the differences in the precision of the discriminator based measurements used to update the navigation solution and possible code/carrier divergence due to ionospheric affects.

Some embodiments provide a system, computer readable storage medium storing instructions, or a method for navigating a mobile object according to signals from satellites.

(A1) In the method for navigating a mobile object, a mobile object receives satellite navigation signals from a plurality of satellites, and also receives base data from a stationary base station. The method generates, from the received satellite navigation signals, satellite navigation data for the mobile object. The satellite navigation data for the mobile object includes code phase estimates and carrier phase estimates for the plurality of satellites. The mobile object comprises a system that includes a first receiver. The method also computes position, velocity and time estimates for the mobile object in accordance with the code phase estimates and carrier phase estimates. The method performs a navigation function for the mobile object in accordance with the computed position, velocity and time estimates for the mobile object. The method generates code phase estimates for the plurality of satellites including by performing a Vector Delay Locked Loop (VDLL) computation process. The method also generates carrier phase estimates for the plurality of satellites including by performing a Real-Time-Kinematics Vector Phase Locked Loop (RTK-VPLL) computation process.

(A2) In some embodiments of the method of A1, the mobile object includes a plurality of channels configured to track signals received by the mobile object from a corresponding number of satellites, each channel associated with a respective satellite, and the base data received by the method from the stationary base station includes, for each channel of the plurality of channels, a base station carrier phase measurement and base station Doppler frequency information for the satellite corresponding to the channel. In these embodiments, the method performs the RTK-VPLL computation process including by: (1) determining a relative navigation solution; and (2) for each channel of the plurality of channels: (a) receiving phase discriminator data for the channel; (b) in accordance with the phase discriminator data for the channel, the base station carrier phase measurement and the base station Doppler frequency information for the satellite corresponding to the channel, and the relative navigation solution, calculating a carrier frequency setting; and (c) in accordance with the calculated carrier frequency setting, updating a respective Carrier NCO for the channel.

(A3) In some embodiments of the method of A1, the mobile object includes a plurality of channels configured to track signals received by the mobile object from a corresponding number of satellites, each channel associated with a respective satellite, and the base data received by the method from the stationary base station includes, satellite measurement data of the stationary base station, the satellite measurement data of the stationary base station including base station code phase measurements and base station carrier phase measurements for the plurality of satellites, Doppler frequency information, and position-related information of the stationary base station. In these embodiments, the method performs the RTK-VPLL computation process including by: (1) receiving phase discriminator data from the plurality of channels; (2) in accordance with the phase discriminator data for the mobile object and the received base data, determining a relative navigation solution comprising RTK-VPLL state estimates; and (3) for each channel of the plurality of channels, (a) in accordance with the relative navigation solution, the received base station carrier phase measurements, and the received Doppler frequency information, calculating a carrier frequency setting for the channel, and (b) in accordance with the calculated carrier frequency setting, updating a respective Carrier NCO for the channel.

(A4) In some embodiments of the method of A3, the method determines the RTK-VPLL state estimates including by calculating relative position estimates of the mobile object relative to the stationary base station using a Kalman filter.

(A5) In some embodiments of the method of A4, the method calculates the relative position estimates using the Kalman filter including by determining a state vector that incorporates clock bias and clock drift of a clock of the mobile object.

(A6) In some embodiments of the method of A5, the clock bias and the clock drift are computed, by the mobile object, relative to a clock of the stationary base station.

(A7) In some embodiments of the method of A3, the method determines the RTK-VPLL state estimates including by calculating an initial position of the mobile object relative to the stationary base station using a Real-Time-Kinematics (RTK) algorithm. In these embodiments, the RTK algorithm includes: (1) receiving code phase estimates and carrier phase estimates from the plurality of channels; and (2) in accordance with the position-related information of the stationary base station and the received code phase estimates and carrier phase estimates, estimating the initial position of the mobile object relative to the stationary base station.

(A8) In some embodiments of the method of any of A3-A7, the method determines the RTK-VPLL state estimates further including by estimating an initial relative velocity and an initial relative clock state using the Kalman filter.

(A9) In some embodiments of the method of A7, the RTK algorithm includes calculating a vector of fixed integer single difference carrier ambiguities.

(A10) In some embodiments of the method of any of A3-A9, the method receives the phase discriminator data from the plurality of channels further including by performing a cycle slip check. In these embodiments, the cycle slip check includes: (1) identifying a cycle slip in a subset of the channels in the plurality of channels; and (2) removing phase discriminator data corresponding to the subset of the channels from the received phase discriminator data used by the Kalman filter to update the relative position estimates of the mobile object.

(A11) In some embodiments of the method of any of A3-A10, the method determines the RTK-VPLL state estimates further by including estimating an initial position of the mobile object relative to the stationary base station using a scalar Phase Locked Loop (PLL) filter.

(A12) In some embodiments of the method of any of A3-A11, the method performs the RTK-VPLL computation process including by: determining if respective residual values of the RTK-VPLL state estimates meet fault detection criteria, and excluding, from updating the respective Carrier Numerically Controlled Oscillator, each of the respective residual values of the RTK-VPLL state estimates that meet the fault detection criteria.

(A13) In some embodiments of the method of A1, the mobile object includes a plurality of channels configured to track signals received by the mobile object from a corresponding number of satellites, each channel associated with a respective satellite. In these embodiments, the method performs the VDLL computation process including by: (1) determining a global navigation solution; (2) receiving code discriminator data from the plurality of channels associated with the plurality of satellites and receiving corresponding Doppler frequency information for each of the plurality of channels; and (3) in accordance with the received code discriminator data, the received Doppler frequency information, and the global navigation solution, updating a respective Code Numerically Controlled Oscillator for a respective channel in the plurality of channels.

(A14) In another aspect, in some embodiments, a navigation module for a mobile object comprises: one or more processors; a satellite receiver to receive satellite navigation signals from a plurality of satellites; a second receiver for receiving base data from a stationary base station; a plurality of channels including a respective channel for each of the satellites in the plurality of satellites, each respective channel in the plurality of channels including a code locked loop to generate a local code navigation solution and a phase locked loop to generate a local carrier navigation solution, the code locked loop including a code discriminator and a code NCO, and the phase locked loop including a carrier discriminator, a phase predictor and a carrier NCO; memory storing a VDLL navigation module and a RTK-VPLL navigation module to be executed by the one or more processors, the VDLL navigation module to perform a VDLL computation process to generate code phase estimates for the plurality of satellites, and the RTK-VPLL navigation module to perform a RTK-VPLL computation process to generate carrier phase estimates for the plurality of satellites; and a navigation application module, executed by the one or more processors, the navigation application module to perform a navigation function for the mobile object in accordance with position and velocity estimates for the mobile object determined in accordance with at least the carrier phase estimates for the plurality of satellites.

(A15) In another aspect, in some embodiments, a non-transitory computer readable storage medium stores including instructions that, when executed by one or more processors of a system for navigating a mobile object according to signals from a plurality of satellites, perform a method comprising: receiving satellite navigation signals from the plurality of satellites; receiving base data from a stationary base station; generating, from the received satellite navigation signals, satellite navigation data for the mobile object, the satellite navigation data for the mobile object including code phase estimates and carrier phase estimates for the plurality of satellites, wherein the mobile object comprises a system that includes a first receiver; in accordance with the code phase estimates and carrier phase estimates, computing position, velocity and time estimates for the mobile object; and performing a navigation function for the mobile object in accordance with the computed position, velocity and time estimates for the mobile object; wherein generating code phase estimates for the plurality of satellites includes performing a Vector Delay Locked Loop (VDLL) computation process; and generating carrier phase estimates for the plurality of satellites includes performing a Real-Time-Kinematics Vector Phase Locked Loop (RTK-VPLL) computation process.

BRIEF DESCRIPTION OF THE DRAWINGS

FIGS. 5A-5I are flowcharts of a method for combined Doppler-aided VDLL and RTK-VPLL measurement, according to some embodiments.

DESCRIPTION OF EMBODIMENTS

Figure 1:
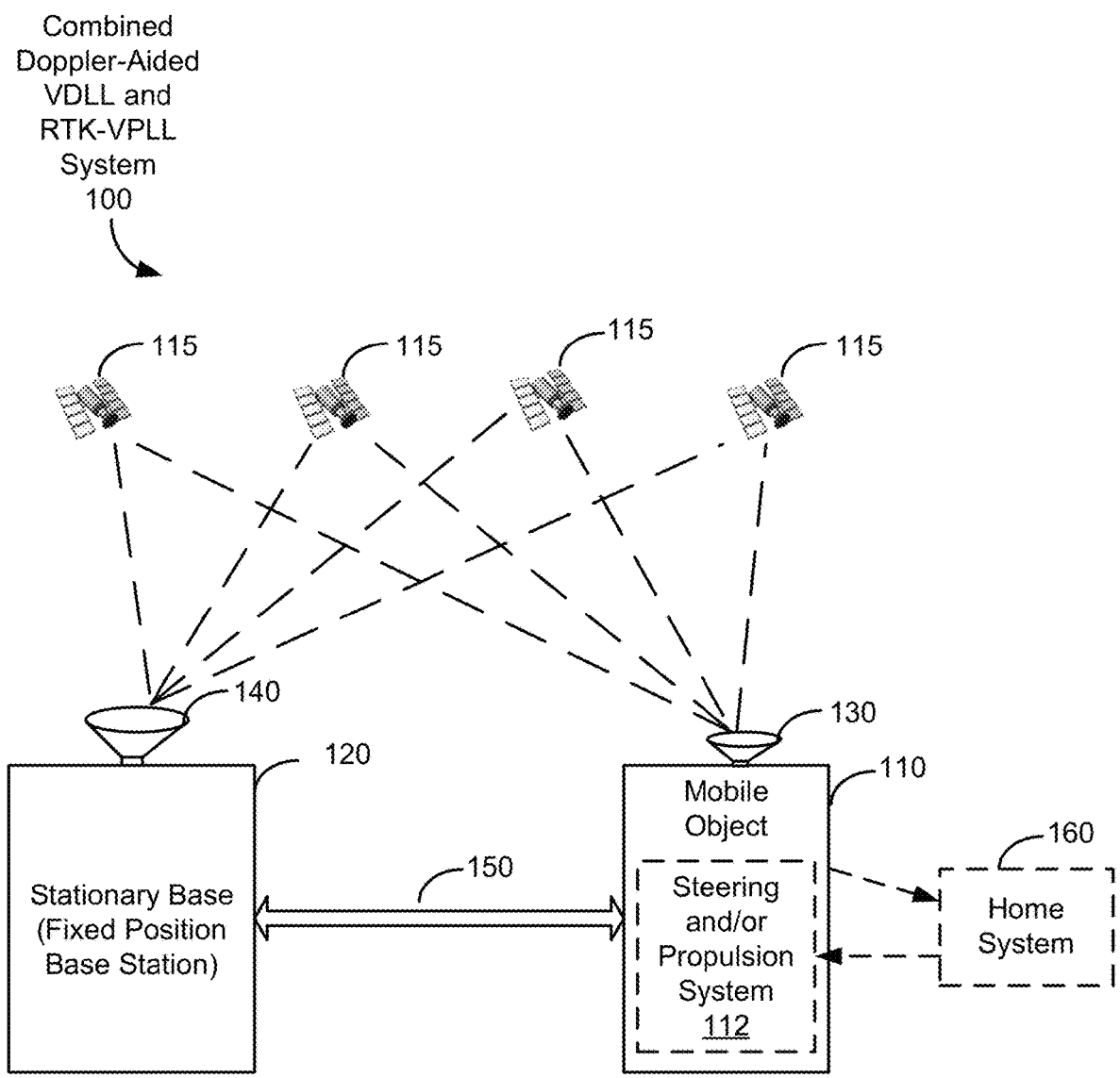
FIG. 1 is a block diagram illustrating combined Doppler-aided VDLL and RTK-VPLL system, according to some embodiments.

FIG. 1 is a block diagram illustrating combined Doppler-aided VDLL and RTK-VPLL system 100, according to some embodiments. Combined Doppler-aided VDLL and RTK-VPLL system 100 enables a mobile object 110 (e.g., a rover such as a tractor or a haul) to determine, at any point of time, its current relative position with respect to a stationary base 120. Stationary base 120 is sometimes called a fixed position base station. Mobile object 110 and stationary base station 120 are both equipped with satellite receivers, including satellite antennas 130 and 140, respectively, to receive satellite navigation signals from at least four satellites 115. The satellite navigation signals received by stationary base station 120 and mobile object 110 are typically global navigation satellite system (GNSS) signals, such as Global Positioning System (GPS) signals at the 1575.42 MHz L1 signal frequency and the 1227.6 MHz L2 signal frequency. In some embodiments, mobile object 110 and stationary base station 120 are also both equipped with communication interfaces, such as communication interfaces that include a radio transmitter and receiver, for transmitting data from stationary base station 120 to mobile object 110, and for mobile object 110 to communicate with external systems (e.g., for transmitting position information, such as relative position information concerning the relative position of mobile object 110 with respect to stationary base station 120). In some embodiments, stationary base 120 includes a communication interface (e.g., 206, FIG. 2A) that includes a transmitter or transceiver for communicating with a computer system via a wired communication medium or local area network.

Stationary base 120 measures the received satellite navigation signals at the specific times and communicates those measurements (e.g., code measurements or code measurement-based pseudoranges to each of the satellites, and carrier phase measurements) at certain specific times (not shown) to mobile object 110, using communication channel 150 (e.g., a wireless communication channel, or more specifically a radio communication channel such as a UHF radio). Optionally, stationary base 120 determines its position at predefined times (e.g., the same times that the satellite signal measurements are sent, or other times) using the satellite navigation signals received from satellites 115 and communicates its position at those times to mobile object 110, using the communication channel 150. However, in many embodiments, communication of the position by stationary base 120 to mobile object 110 is not necessary.

Mobile object 110 determines its relative position with respect to stationary base 120, based on at least (A) satellite navigation signals received by mobile object 110 from satellites 115, and (B) the satellite signal measurement data received from stationary base 120. The relative position determined by mobile object 110 is represented by a differential position value, such as a relative position vector. In the following discussion, and throughout this document, the term "relative position vector" means the "relative position vector between mobile object 110 and stationary base 120, or vice versa."

In some embodiments, mobile object 110 is configured to generate a relative position vector for any specified time by 1) determining a relative position vector between mobile object 110 and stationary base 120 at predefined times or intervals (e.g., at one second intervals), herein called epoch boundary times; and 2) combining the relative position vector at a last epoch boundary time prior to the specified time with the change in position at mobile object 110 between the specified time and the prior epoch boundary time. This process generates an accurate (e.g., within a few centimeters) relative position vector between mobile object 110 and stationary base 120 at any specified time that is between epoch boundary times (e.g., the current time, or an earlier time after the last epoch boundary time). In some implementations, a system such as mobile object 110 is configured to generate updated relative position vectors at a rate that is greater than or equal to 10 Hz (e.g., an updated relative position vector is generated every 100 milliseconds when the update rate is 10 Hz, 40 milliseconds when the update rate is 25 Hz, or every 20 milliseconds when the update rate is 50 Hz).

In some embodiments, mobile object 110 reports a relative position vector and/or a current position of mobile object 110 to home system 160. Home system 160 may be a server or a client system (e.g., a desktop, a laptop, a cell phone, a tablet, a personal digital assistant (PDA), etc.). In some embodiments, the home system is located in mobile object 110 or stationary base 120. Home system 160 is optionally linked to a network such as the Internet. Optionally, home system 160 is configured to control movement of mobile object 110 (e.g., by controlling steering and/or propulsion systems 112 of mobile object 110) so as maintain a predefined distance or relative position vector between stationary base 120 and mobile object 110. In some embodiments, system 100 does not include a home system 160, while in some other embodiments mobile object 110 is in communication with home system 160 only intermittently.

Figure 2A:
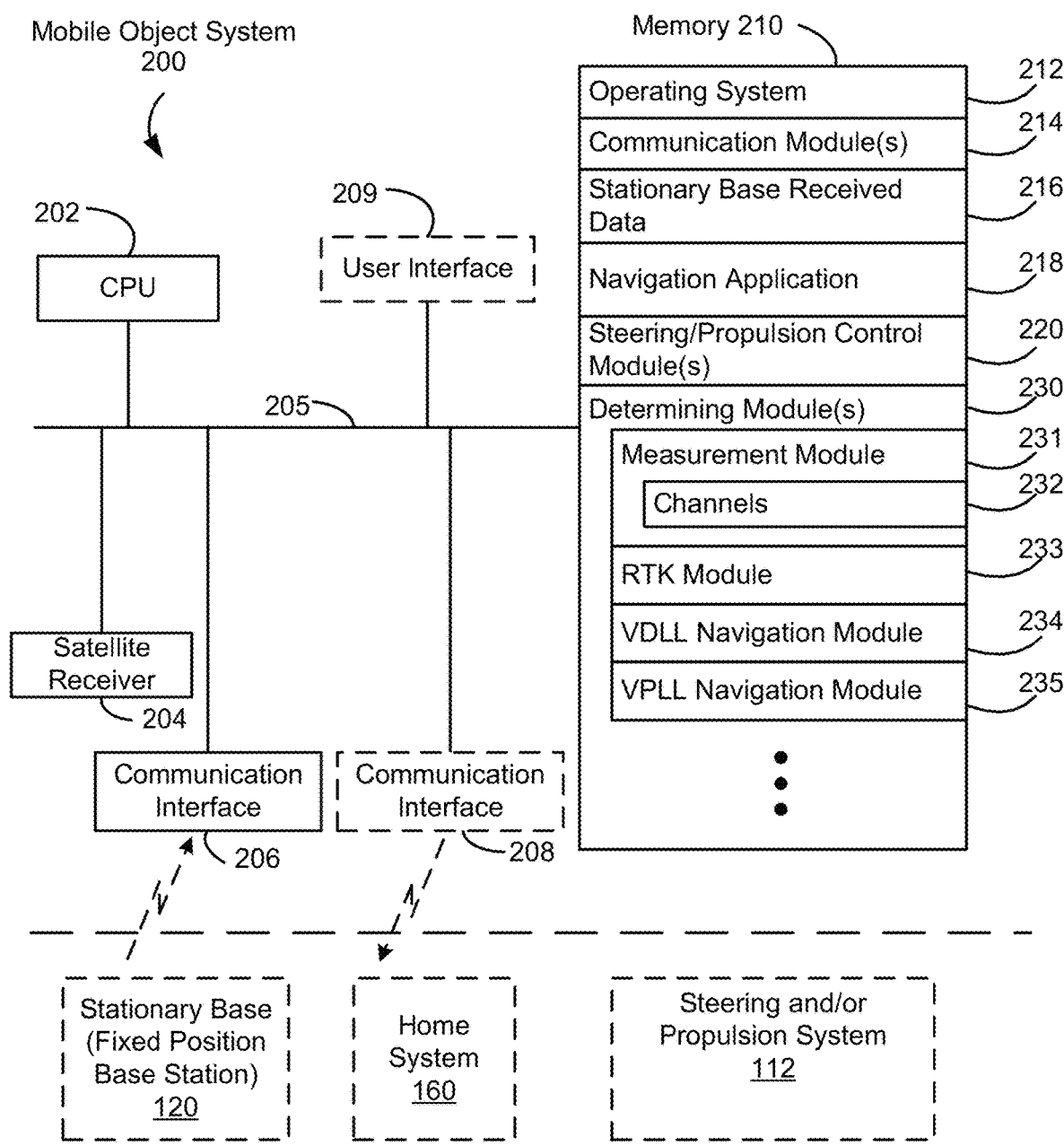
FIG. 2A is a block diagram illustrating a mobile object system of the combined Doppler-aided VDLL and RTK-VPLL system of FIG. 1, according to some embodiments.

FIG. 2A is a block diagram illustrating a mobile object system 200, corresponding to mobile object 110 in the combined Doppler-aided VDLL and RTK-VPLL system 100 of FIG. 1, according to some embodiments. Mobile object system 200 typically includes one or more processors (CPU's) 202 for executing programs or instructions; satellite receiver 204 for receiving satellite navigation signals; one or more communication interfaces 206, 208; memory 210; and one or more communication buses 205 for interconnecting these components. Mobile object system 200 optionally includes a user interface 209 comprising a display device and one or more input devices (e.g., one or more of a keyboard, mouse, touch screen, keypad, etc.). The one or more communication buses 205 may include circuitry (sometimes called a chipset) that interconnects and controls communications between system components.

Communication interface 206 (e.g., a receiver or transceiver) is used by mobile object system 200 to receive communications from stationary base 120. Communication interface 208 (e.g., a transmitter or transceiver, such as a radio transmitter or transceiver, or a wired communication transmitter or transceiver), if included in system 200, is used by mobile object system 200 to send signals from mobile object 110 to the home system 160, reporting information corresponding to the relative position vector with respect to stationary base 120 and/or a current position of mobile object 110. In some embodiments, communication interfaces 206 and 208 are a single transceiver, while in other embodiments they are separate transceivers or separate communication interfaces. In some embodiments, communication interface 208 is a wireless communication interface for connecting mobile object system 200 to home system 160 via the internet, and communication interface 206 is a wireless communication interface that enables communication with stationary base station 120 using a predefined point to point communication channel, which in some embodiments is an encrypted communication channel. In some embodiments, mobile object system 200 includes one or more additional receivers or communication interfaces for receiving or exchanging information with other systems, for example for receiving wide area differential global positioning system information.

Memory 210 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 210 optionally includes one or more storage devices remotely located from the CPU(s) 202. Memory 210, or alternately the non-volatile memory device(s) within memory 210, comprises a computer readable storage medium. In some embodiments, memory 210 or the computer readable storage medium of memory 210 stores the following programs, modules and data structures, or a subset thereof:

An operating system 212 that includes procedures for handling various basic system services and for performing hardware dependent tasks.

One or more communication modules 214 that operate in conjunction with communication interface 206 (e.g., a receiver or transceiver) to handle communications between stationary base 120 and mobile object system 200, and communication interface 208 (e.g., a transmitter or transceiver) to handle communications between mobile object system 200 and home system 160. In some embodiments, the communication modules 214 include drivers, which when executed by the one or more processors 202, enable various hardware modules in communication interface 206 to receive messages from stationary base 120 and in communication interface 208 to send messages to home system 160.

Stationary base received data (e.g., one or more sets of recently received data, optionally implemented as a local database) 216, which includes data (e.g., data corresponding to satellite signal measurements) associated with the position (e.g., a surveyed three-dimensional position) of stationary base 120, as will be discussed below with respect to FIGS. 3-6. In some embodiments, data 216 is used by RTK module 233, as described in more detail below, to help determine the location of mobile object system 200.

Navigation application 218, which in some embodiments includes instructions to help the mobile object perform navigation functions, such as to direct the mobile object 110 along a path (e.g., on a roadway, or in an agricultural field), or to maintain the mobile object 110 with a fixed attitude and distance relative to another mobile object (not shown).

Steering or propulsion control module 220 to steer or control propulsion of the mobile object 110.

One or more determining modules 230 (sometimes called navigation modules) that when executed by the CPU 202 determine a relative position vector of mobile object 110 relative to stationary base 120, based on stationary base data received from stationary base 120 via communications receiver 206 and satellite navigation data received from the satellites 115 by satellite receiver 204 (receiver 130, FIG. 1).

In some implementations, determining modules 230 include a measurement module 231, a RTK module 233, a VDLL Navigation module 234, and a VPLL Navigation module 235, as described below.

In some embodiments, measurement module 231 processes the received satellite navigation signals to determine satellite navigation data for mobile object 110 at a sequence of times, sometimes call epoch boundary times, and optionally at times between the epoch boundary times. This processing involves measuring or determining measurements of the received satellite navigation signals. For example, the measurements may include, for each satellite from which navigation signals are received, a pseudorange between the mobile object and the satellite, and phase measurements at one or more predefined frequencies, such as the L1 frequency, or the L1 and L2 frequencies. RTK module 233 uses the stationary base data and the mobile object satellite navigation data for a specific time (e.g., an epoch boundary time) to generate an RTK value, which is the relative position vector for that specific time.

Measurement module 231 includes channels 232, described below with reference to FIG. 4A, which correspond to components 402 in FIG. 4A. In some embodiments, measurement module 231 includes four or more channels, with each channel tracking the signal received from a respective satellite.

RTK module 233 determines the relative position vector at specific times (e.g., epoch boundary times) using stationary base data (i.e., satellite measurement data for stationary base 120 at each specific time, or for stationary base 120 at an earlier specific time, as received from stationary base 120 at times later than the specific times) and satellite signal measurements made at mobile object system 200 (at mobile object 110) at each specific time. The computation of the relative position vector at each specific time is performed in accordance with well-known real-time-kinematics (RTK) methodologies.

Optionally, in applications in which an absolute position of mobile object 110 is needed, navigation application 218 and/or determining module(s) 230 receives data from stationary base 120 indicating the position of stationary base 120, and adds the determined relative position vector to the position of stationary base 120 to determine the absolute position of mobile object 110.

VDLL Navigation Module 234 and VPLL Navigation Module 235 are described later in the context of FIGS. 4A and 4B.

Operating system 212 and each of the above identified modules and applications correspond to a set of instructions for performing a function described above. The set of instructions can be executed by the one or more processors 202 of stationary base system 200. The above identified modules, applications or programs (i.e., sets of instructions) need not be implemented as separate software programs, procedures or modules, and thus various subsets of these modules may be combined or otherwise re-arranged in various embodiments. In some embodiments, memory 210 stores a subset of the modules and data structures identified above. Furthermore, memory 210 optionally stores additional modules and data structures not described above.

FIG. 2A is intended more as functional description of the various features which may be present in a mobile object system 200 than as a structural schematic of the embodiments described herein. In practice, and as recognized by those of ordinary skill in the art, items shown separately could be combined and some items could be separated. For example, some items shown separately in FIG. 2A could be combined into a single module or component, and single items could be implemented using two or more modules or components. The actual number of modules and components, and how features are allocated among them will vary from one implementation to another.

Figure 2B:
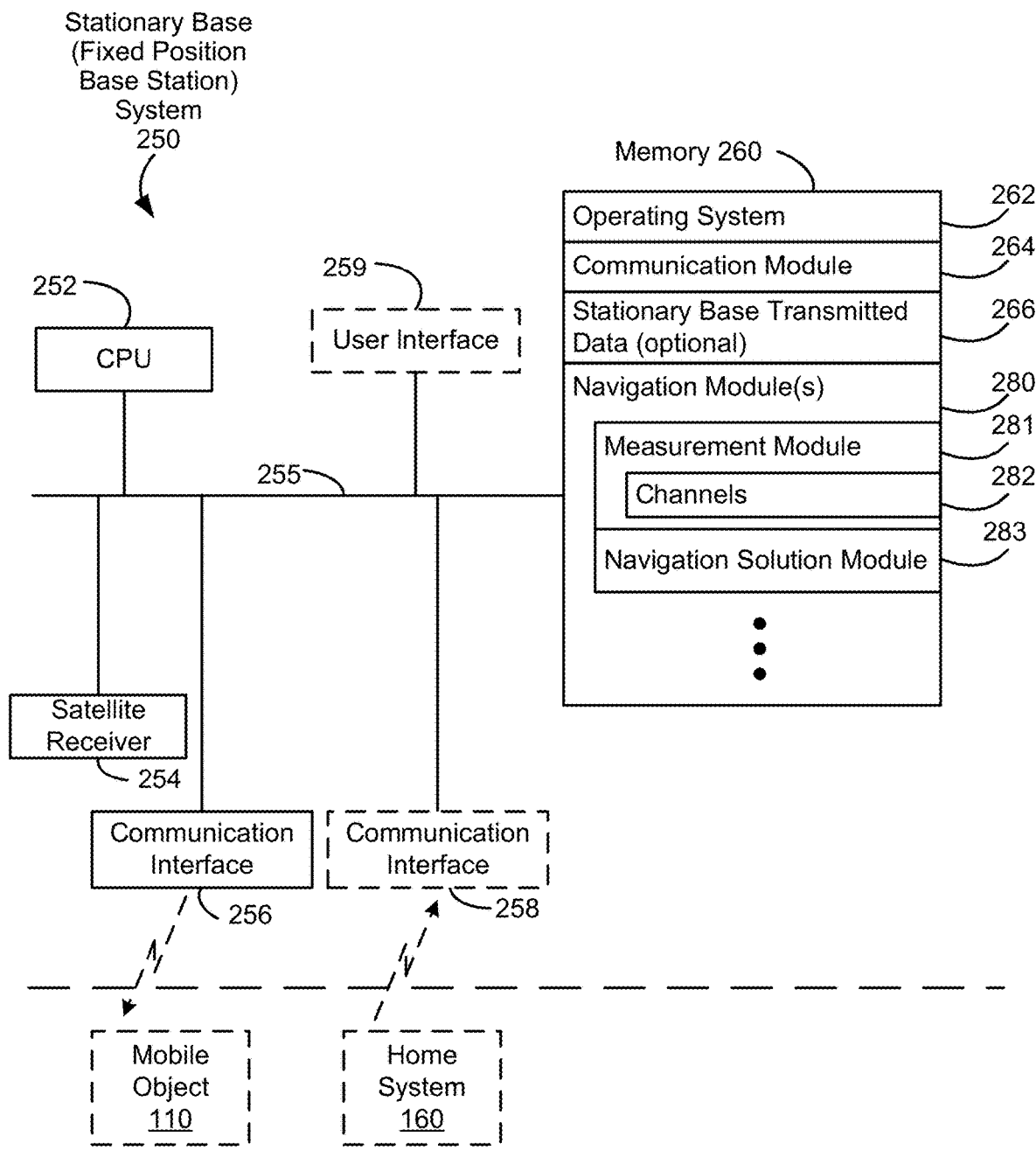
FIG. 2B is a block diagram illustrating a stationary base (fixed position base station) system of the combined Doppler-aided VDLL and RTK-VPLL system of FIG. 1, according to some embodiments.

FIG. 2B is a block diagram illustrating a stationary base station (fixed position base station) system 250, corresponding to stationary base station 120 in the combined Doppler-aided VDLL and RTK-VPLL system 100 of FIG. 1, according to some embodiments. Stationary base station system 250 typically includes one or more processors (CPU's) 252 for executing programs or instructions; satellite receiver 254 for receiving satellite navigation signals; one or more communication interfaces 256, 258; memory 260; and one or more communication buses 255 for interconnecting these components. Stationary base station system 250 optionally includes a user interface 259 comprising a display device and one or more input devices (e.g., one or more of a keyboard, mouse, touch screen, keypad, etc.). The one or more communication buses 255 may include circuitry (sometimes called a chipset) that interconnects and controls communications between system components.

Communication interface 256 (e.g., a transmitter or transceiver) is used by stationary base station system 250 to transmit data to mobile object 110, and in some implementations is used to transmit data to multiple mobile objects (not shown). Communication interface 258 (e.g., a receiver or transceiver, such as a radio receiver or transceiver, or a wired communication receiver or transceiver), if provided, is used by stationary base station system 250 to exchange information with home system 160, for example sending information regarding the functional status of stationary base station 250. In some embodiments, communication interfaces 256 and 258 are a single transceiver, while in other embodiments they are separate transceivers or separate communication interfaces. In some embodiments, stationary base station 250 includes one or more additional receivers or communication interfaces (not shown) for receiving or exchanging information with other systems, for example for receiving wide area differential global positioning system information.

Memory 260 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 260 optionally includes one or more storage devices remotely located from the CPU(s) 252. Memory 260, or alternately the non-volatile memory device(s) within memory 260, comprises a computer readable storage medium. In some embodiments, memory 260 or the computer readable storage medium of memory 260 stores the following programs, modules and data structures, or a subset thereof:

An operating system 262 that includes procedures for handling various basic system services and for performing hardware dependent tasks.

Communication Module 264 that operates in conjunction with communication interface 256 (e.g., a transmitter or transceiver) to handle communications between stationary base station system 250 and mobile object 110 (mobile object system 200), and communication interface 258 (e.g., a receiver or transceiver), if provided in stationary base system 250, to handle communications between stationary base station system 250 and home system 160. In some embodiments, communication module 264 includes drivers, which when executed by the one or more processors 252, enable various hardware modules in communication interface 256 to transmit messages (or more generally, data) from stationary base station 120 to mobile object 110 and in communication interface 258 to exchange messages with home system 160.

Figure 5A:
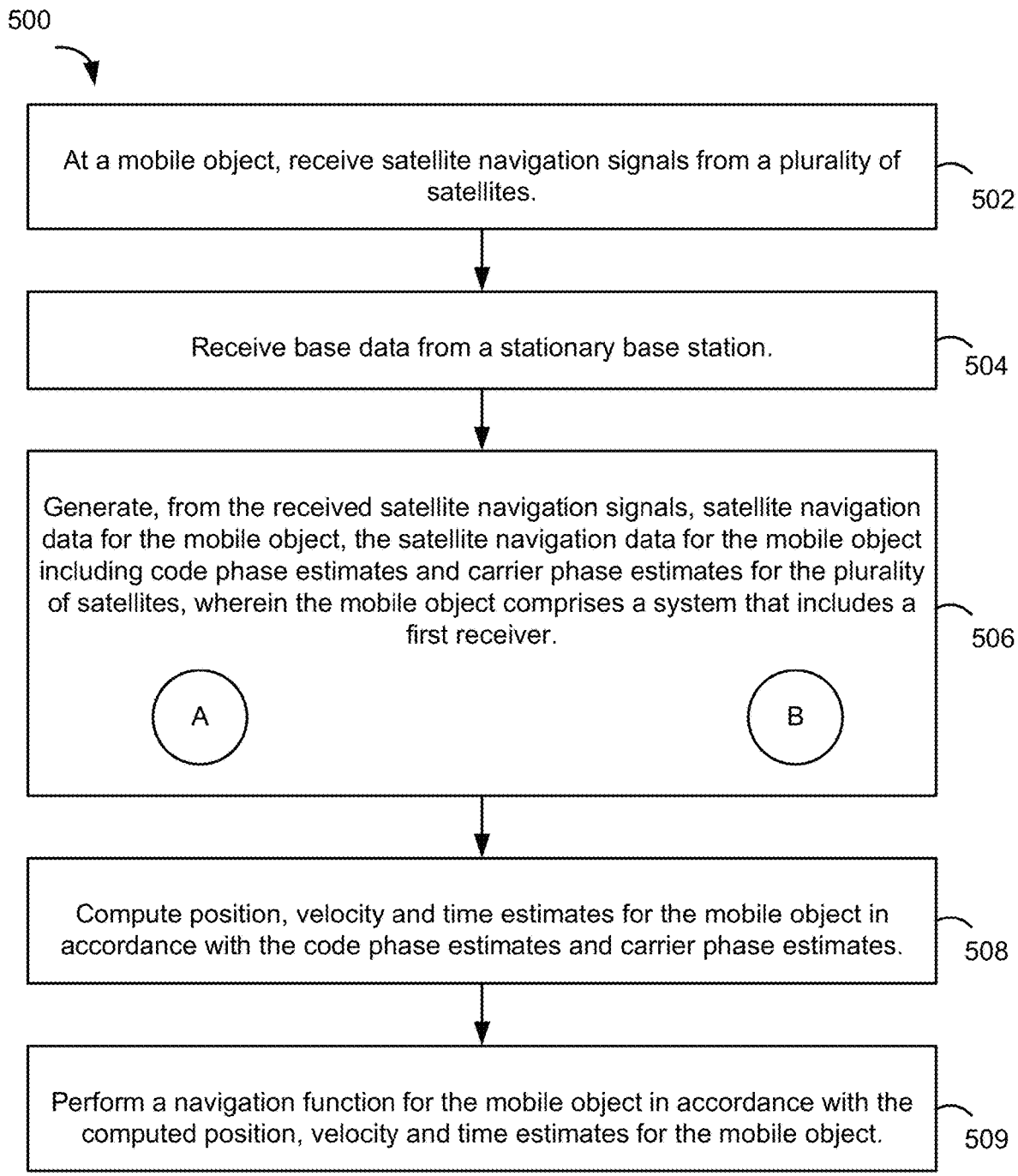
Figure 5B:
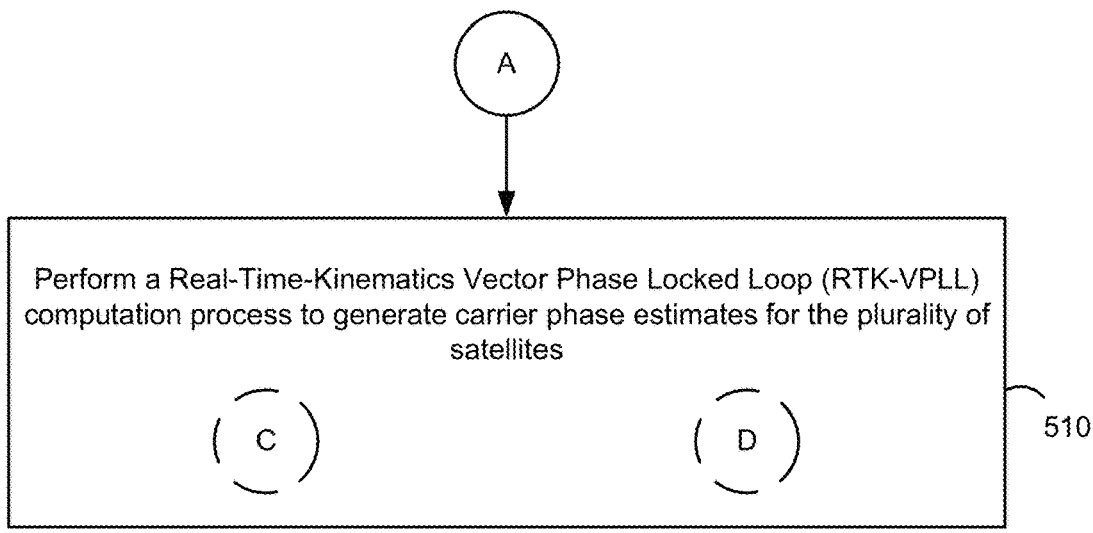
Figure 5C:
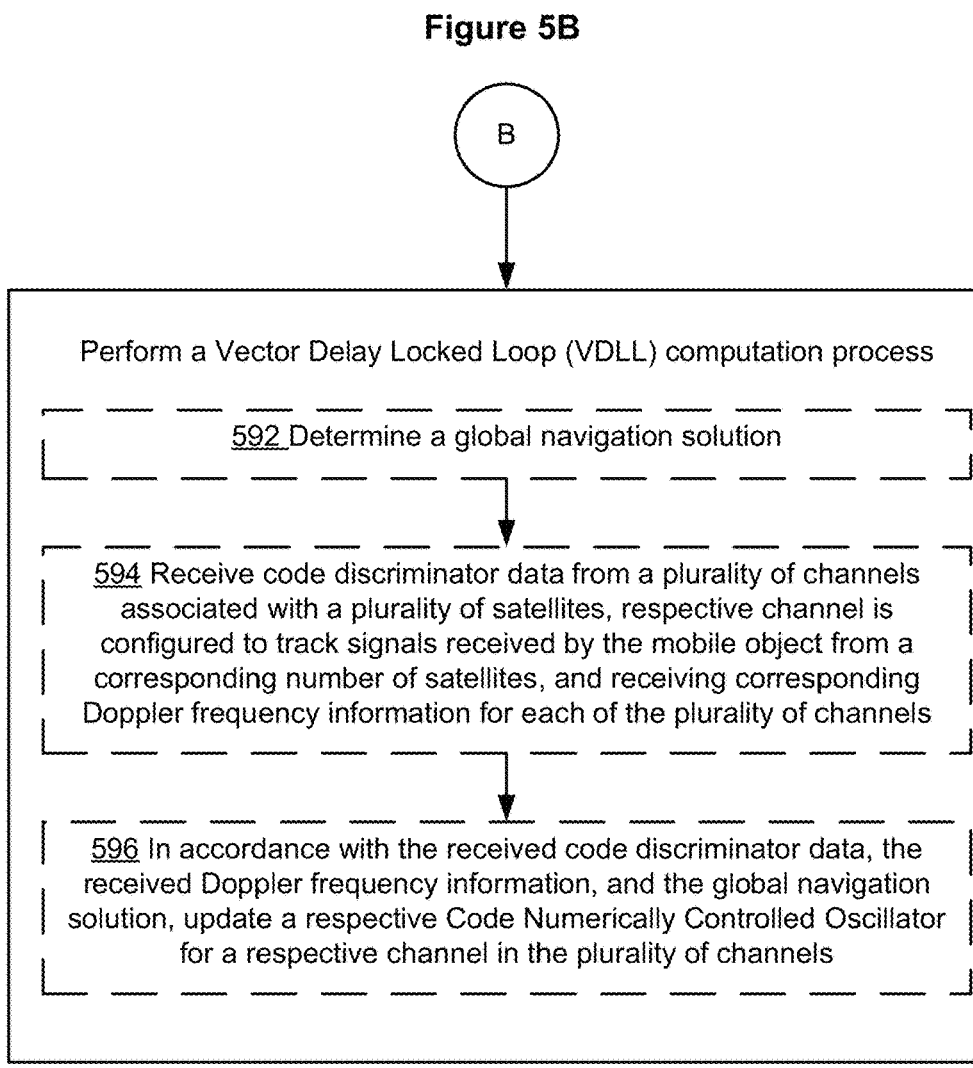

An optional database 266 of data transmitted by stationary base station 120 to mobile object 110 (as described in more detail below with respect to FIG. 5A).

One or more navigation modules 280 that when executed by the CPU 252 determine satellite navigation data to be transmitted by stationary base station 120 to mobile object 110, based on satellite navigation signals received by satellite receiver 254 (receiver 140, FIG. 1).

In some embodiments, navigation modules 280 include measurement module 281, which processes satellite navigation signals received by stationary base station 120 to determine satellite navigation data for stationary base station 120 at a sequence of times, including epoch boundary times and optionally including times between the epoch boundary times. This processing involves measuring or determining measurements of the received satellite navigation signals. For example, the measurements may include a code measurement (e.g., a pseudorange) and L1 phase measurements, or optionally L1 and L2 phase measurements, for each satellite from which navigation signals are received.

Measurement module 281 includes channels 282. In some embodiments, channels 282 are similar to channels 232 (FIG. 2A, described above) in mobile object system 200, and use vector processing loops. In other embodiments, channels 282 use scalar loops and generate local navigation solutions without using cross-channel information. More details of channel architecture, in the context of a vector receiver, are discussed further below in the context of FIG. 4A corresponding to channels 402. In some embodiments, the measurement module 281 includes four or more channels, with each channel tracking the signal received from a respective satellite.

Navigation solution module 283 works in conjunction with the measurement module and computes a navigation solution, such as position (or position error, relative to the known or surveyed position of stationary base system 250), time, pseudorange and GPS information, for the stationary base station 120.

Operating system 262 and each of the above identified modules of stationary base station system 250 and applications correspond to a set of instructions for performing a function described above. The set of instructions can be executed by the one or more processors 252 of stationary base station system 250. The above identified modules, applications or programs (i.e., sets of instructions) need not be implemented as separate software programs, procedures or modules, and thus various subsets of these modules may be combined or otherwise re-arranged in various embodiments. In some embodiments, memory 260 stores a subset of the modules and data structures identified above. Furthermore, memory 260 optionally stores additional modules and data structures not described above.

FIG. 2B is intended more as functional description of the various features which may be present in a stationary base station system 250 than as a structural schematic of the embodiments described herein. In practice, and as recognized by those of ordinary skill in the art, items shown separately could be combined and some items could be separated. For example, some items shown separately in FIG. 2B could be combined into a single module or component, and single items could be implemented using two or more modules or components. The actual number of modules and components, and how features are allocated among them will vary from one implementation to another.

Figure 3A:
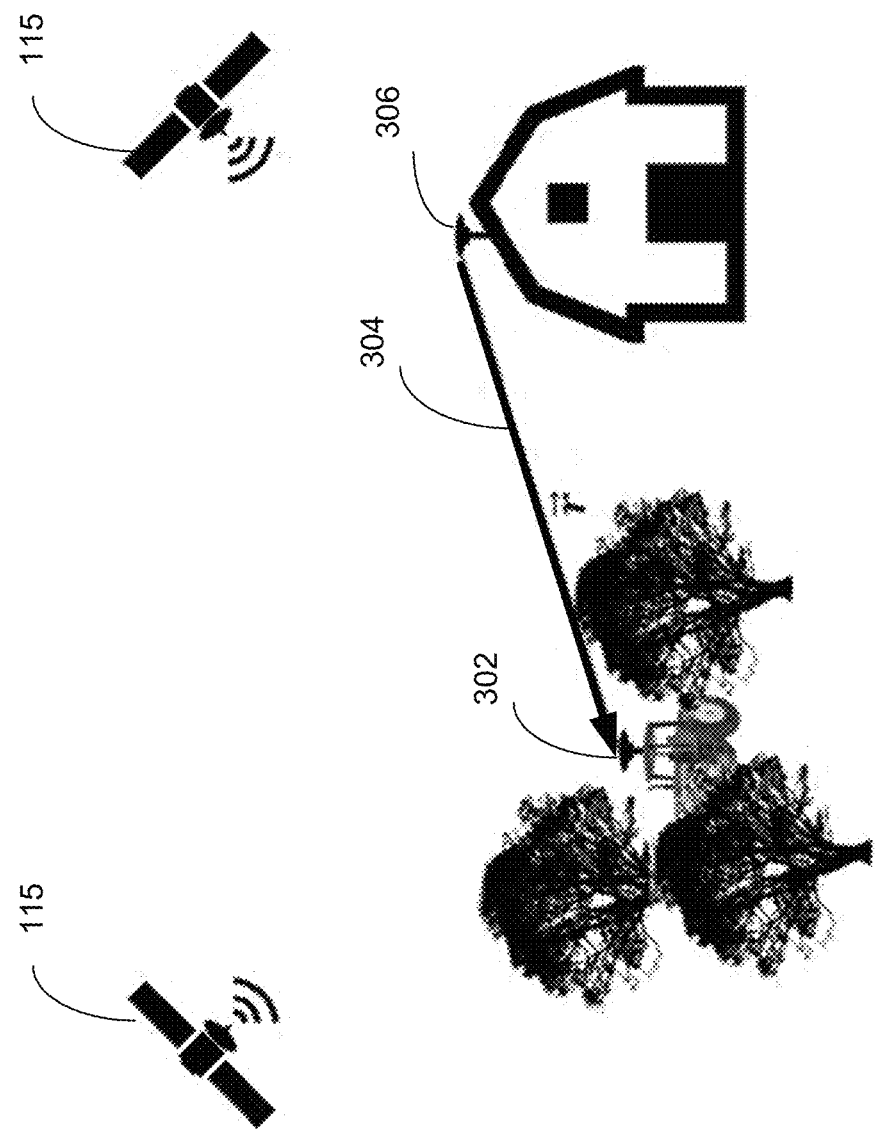
FIG. 3A is a conceptual drawing of the combined Doppler-aided VDLL and RTK-VPLL system of FIG. 1.

FIG. 3A is a conceptual drawing of the combined Doppler-aided VDLL and RTK-VPLL system of FIG. 1. A mobile, vector tracking, receiver 302 is mounted on a rover vehicle (sometimes herein called the mobile object or the rover object, and illustrated with the tractor in FIG. 3), and a local stationary base station receiver 306 (sometimes herein called the base receiver) is mounted in the area with a clear view of the sky. The mobile receiver 302 and stationary base station receiver 306 receive signals from the plurality of satellites 115. The mobile receiver 302 uses differential carrier phase positioning 304 and base station measurements (not shown) from stationary base station 306 to improve phase tracking in degraded environments.

Figure 3B:
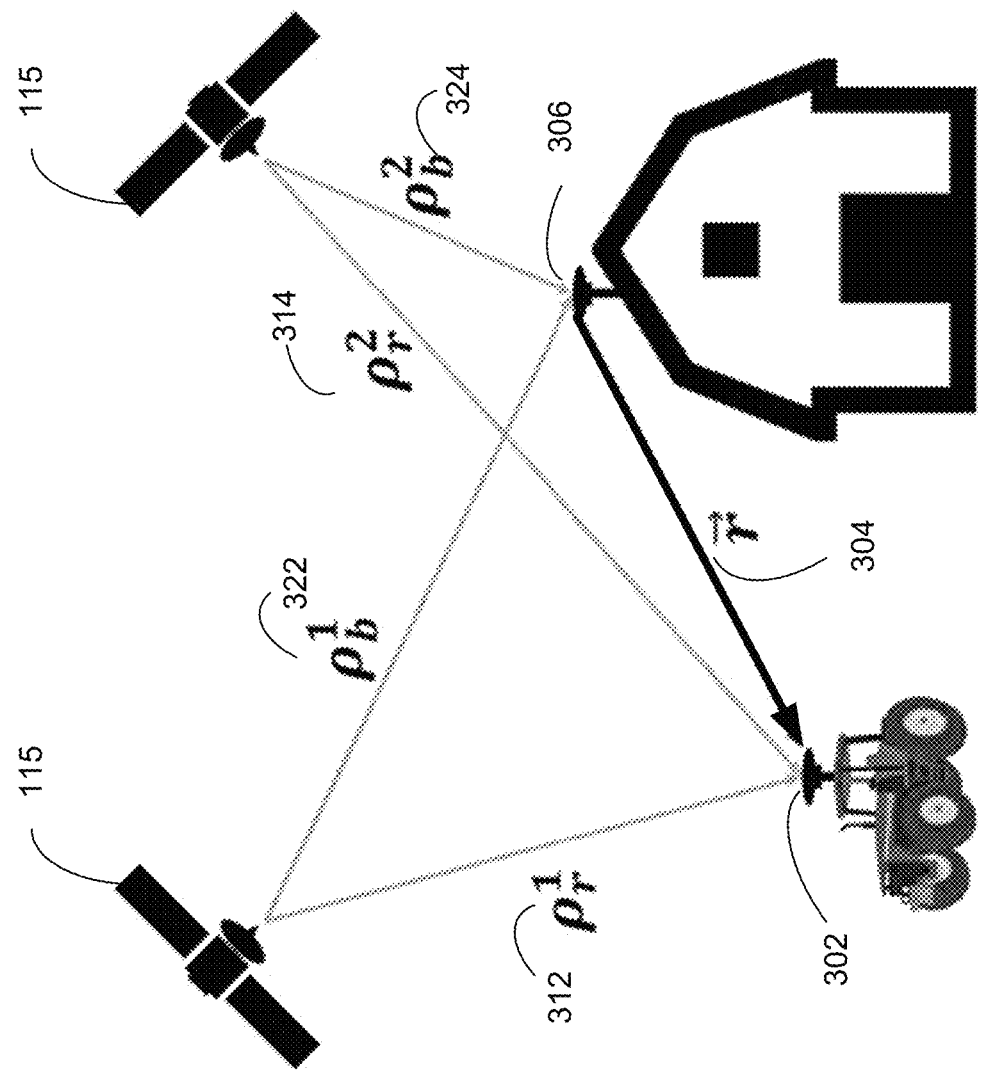
FIG. 3B is an illustration of a differential GPS receiver that uses pseudorange or carrier phase measurements from common satellites to reduce common mode errors and improve positioning accuracy.

FIG. 3B is an illustration of a differential GPS receiver that uses pseudorange or carrier phase measurements from common satellites (i.e., satellites in view of both the mobile receiver 302 and stationary base station receiver 306, or more precisely, satellites from which both the mobile receiver 302 and stationary base station receiver 306 receive navigation signals) to reduce common mode errors and improve positioning accuracy. The base station receiver 306 is mounted on a structure with a clear view of the sky and the rover receiver (mobile receiver 302) is mounted on a vehicle. Atmospheric corruption of the received signal from a common satellite is highly correlated for the rover 302 and base receiver 306. Using the pseudorange measurements (312 and 314) from the rover receiver 302 and the pseudorange measurements (322 and 324) from base receiver 306, the position of the rover relative to the position of the base 304 can be estimated more accurately (typically one order of magnitude) than the global position estimates of a standalone receiver. The relative position is then added to the known location of the base antenna to calculate the absolute position (sometimes called the differential pseudorange position solution) of the mobile receiver 302.

Figure 4A:
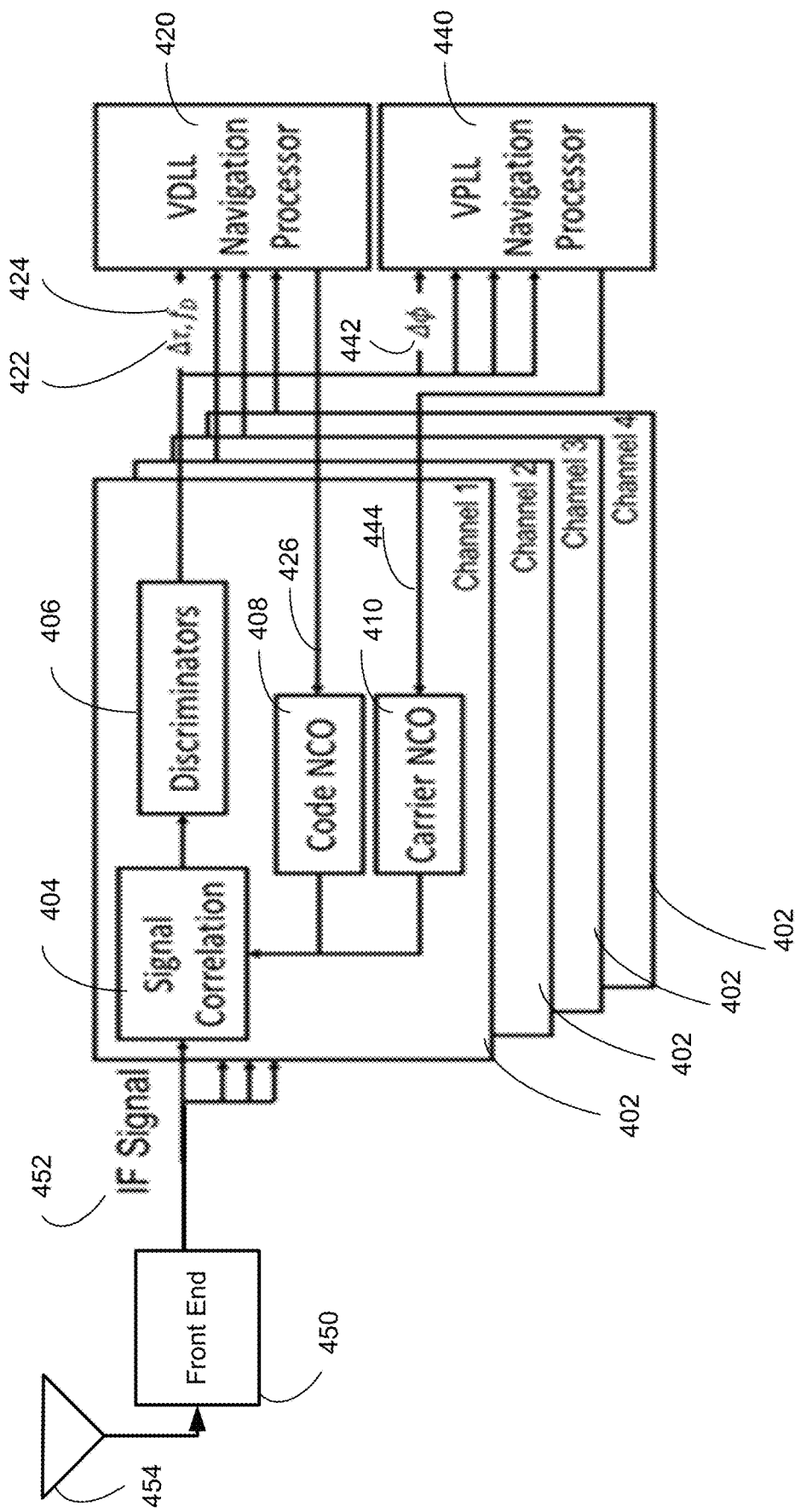
FIG. 4A is a block diagram of a receiver architecture that uses two navigation processors to track code and carrier phase independently.

FIG. 4A is a block diagram of a receiver architecture, corresponding to determining modules 230 in FIG. 2A, that uses two navigation processors to track code and carrier phase independently. In some embodiments, as illustrated in FIG. 4, there are four or more channels 402 (shown as Channel 1, Channel 2, Channel 3, and Channel 4), with each channel 402 tracking a respective satellite communication signal 452. The signal received at the antenna 454 passes through a radio frequency front end 450, where it is filtered and mixed down to a lower intermediate frequency (IF) 452 and sampled. Antenna 454 and front end 450 correspond to satellite receiver 204, FIG. 2A. The samples are then processed by several independent channels to produce measurements of code phase error and carrier frequency or carrier phase error. Each channel 402 includes a signal correlation module 404, a discriminator module 406, a Code Numerically Controlled Oscillator (NCO) 408, and a Carrier NCO 410. The discriminator module 406 includes a code discriminator (not shown) and a carrier phase discriminator (not shown). Code discriminator data 422 and a Doppler frequency value 424 from each channel 402 feed a VDLL navigation processor 420. A carrier phase discriminator value 442 from each channel 402 each is used to update a VPLL navigation filter 440 (sometimes herein called VPLL navigation processor, VPLL, or RTK-VPLL). The VDLL navigation processor 420 drives the Code NCO 408 with signal update 426, and the VPLL navigation processor 440 drives the Carrier NCO 410 with signal update 444. This architecture prevents the less accurate code discriminator measurements 422 from degrading the accuracy of the carrier phase based navigation solution generated by the VPLL navigation filter 440. The Doppler frequency values 424 are used to improve the velocity and clock drift state estimates 426 in the VDLL navigation filter 420, and act like carrier smoothing or Doppler aiding in traditional scalar receivers.

In some embodiments, the VDLL navigation processor 440 is not a differential navigation filter, meaning that the pseudorange measurements from a base station receiver are not used in navigation solution update or prediction by VDLL navigation processor 440. In these embodiments, the VDLL navigation processor 420 is robust without need of external data (for example, base station measurements), and can maintain a navigation solution during a communication disruption. In some embodiments, the required communication bandwidth between the stationary base station and the mobile object is reduced by removing pseudorange measurements from the messages sent by the stationary base station.

The navigation filters (VDLL navigation processor 420 and VPLL navigation processor 440) use code and carrier phase errors calculated from correlator 404 outputs to update the state estimates generated by those processors. Some embodiments use the mathematical model of in-phase and quadrature correlators given by Equation (1) below.

$$I(k,\gamma)=AR(\in+\gamma)D(k)\cos(\pi f_e T+\delta\phi)+\eta_I(k) \quad\quad 1.a$$

$$Q(k,\gamma)=AR(\in+\gamma)D(k)\sin(\pi f_e T+\delta\phi)+\eta_I(k) \quad\quad 1.b$$

In the equations 1.a and 1.b above, A is the received signal amplitude, $\in$ is the code phase error, $f_e$ is the carrier frequency error, and $\delta\phi$ is the carrier phase error. $\gamma$ is the offset for the early and late replicas (of the satellite signal) used to generate the code phase error measurement. Code phase and carrier phase error observables are used to update the VDLL 420 and VPLL 440 navigation processors.

Figure 4B:
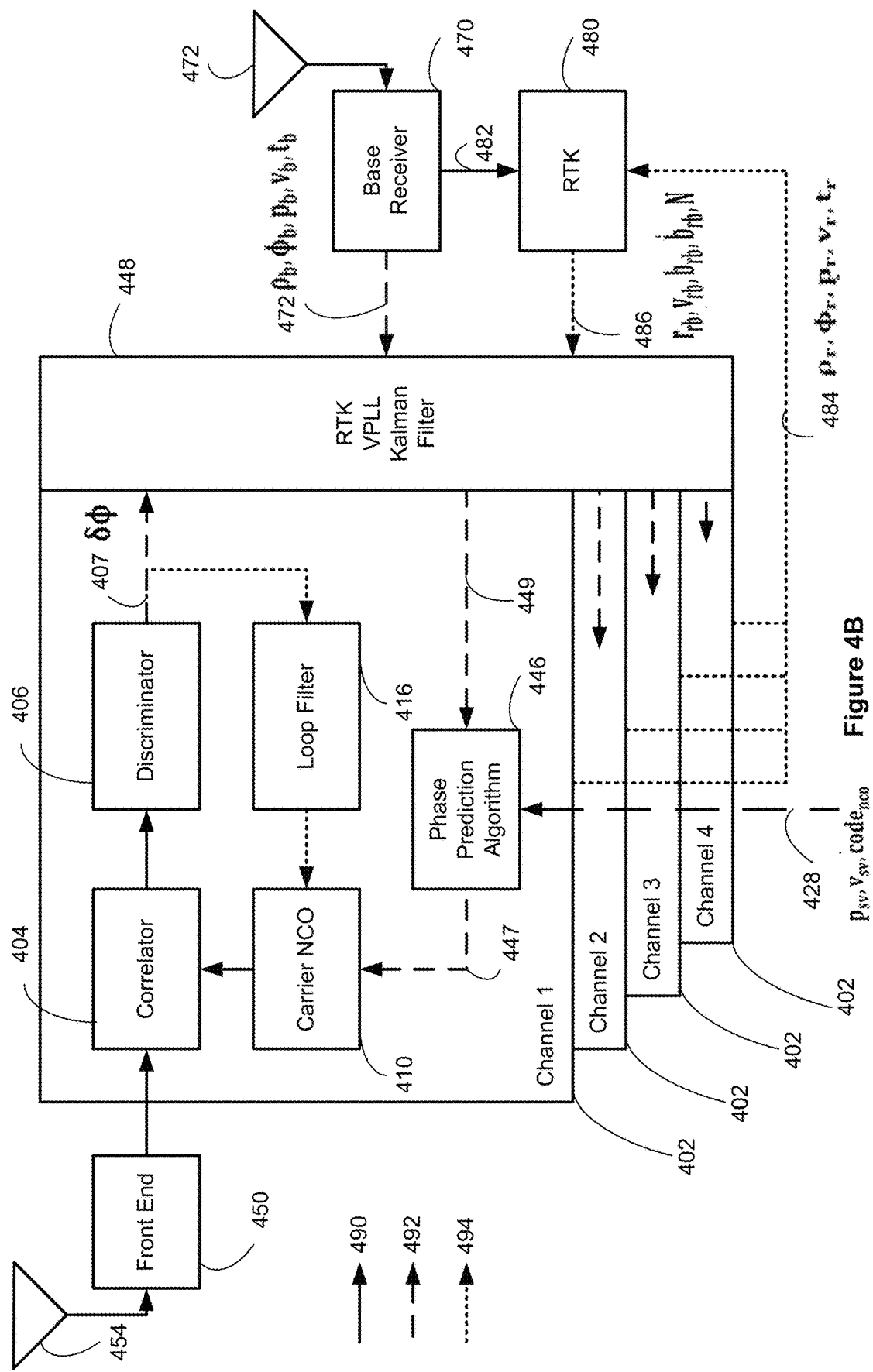
FIG. 4B is a block diagram of a RTK-VPLL receiver architecture using carrier phase measurements from a stationary base station.

FIG. 4B is a block diagram of the modules used in a RTK-VPLL receiver architecture that uses carrier phase measurements from a stationary base station, according to some embodiments. Additionally, FIG. 4B highlights the different modes of the receiver from initialization (shown by dotted lines 494) through vector operation (shown by dashed lines 492), according to some embodiments. The solid black lines 490 represent receiver operations that continue at all times, including correlation and discrimination block operations. The dotted black lines 494 connect the elements that are required to calculate an initial receiver position (sometimes called the first receiver position) and form the initial high precision relative position vector. In some embodiments, the RTK-VPLL receiver is initialized using a scalar phase locked loop (PLL) in the rover receiver (indicated by the dotted black lines 494 through the Loop Filter 416), measurements from the base receiver (indicated by the dashed black line 492 from the Base Receiver 470), using a differential carrier phase positioning (RTK) algorithm 480. The dotted black line 494 from the RTK block 480 shows outputs of the RTK algorithm that are used to initialize the RTK-VPLL. The dashed black lines 492 map the route of data through the RTK-VPLL receiver components.

Also, FIG. 4B summarizes the steps taken to update the Carrier NCO 410 according to some embodiments. In some embodiments, the Loop Filter block 416 in the figure is only in operation during initialization of the receiver, to lock phase so that the navigation data message can be decoded. In some embodiments, pseudorange and carrier phase measurements from the rover receiver 302 (indicated by signals 484) and base receiver 306 (indicated by signals 482) are combined in RTK block 480 to estimate the relative position, velocity, clock states, and carrier ambiguities (indicated by output signal 486) of the mobile object. Once the carrier ambiguities have been resolved, the estimates 486 are used to initialize the RTK-VPLL Kalman filter 448. From that point on, the carrier tracking loop (consisting of Correlator 404, Discriminator 406, and Carrier NCO 410) is closed by updating the Carrier NCO 410 using RTK-VPLL state estimates, the base station carrier phase measurements 472, and the satellite position and velocity (indicated by input signal 428) to predict the received signal phase 447 for each channel. In some embodiments, a phase prediction algorithm 446 calculates the predicted phases 447 for each channel 402. The carrier phase discriminator outputs ($\delta\phi$ 407) from each channel are used to update the navigation solution (and is also the input to the RTK-VPLL Kalman Filter 448 for the next cycle). In some embodiments, the integrate and dump periods (described later) of the various channels 402 do not end at the same time, and therefore the navigation updates happen asynchronously.

As mentioned above, in some embodiments, the RTK block 480 is used to initialize the RTK-VPLL Kalman Filter 448. The RTK block 480 calculates and outputs 486 the Earth-Centered, Earth-Fixed (ECEF) x, y and z components of the estimated relative position vector ($r_{rb}$), the ECEF vx, vy and vz components of the estimated relative velocity vector ($v_{rb}$), the relative clock bias ($b_{rb}$) and clock drift ($\dot{b}_{rb}$), and the fixed integer single difference carrier phase ambiguities (N).

The inputs to the phase prediction block 446 are the state estimates 449 (relative position, relative velocity, relative clock bias, and relative clock drift) from the RTK-VPLL Kalman Filter 448, the fixed integer values (N), the satellite positions ($p_{sv}$), the satellite velocities ($v_{sv}$), and the code NCO phase ($code_{nco}$). In some embodiments, the satellite positions and velocities are calculated using the decoded navigation data message. For example, satellite position is calculated using broadcast ephemerides in the navigation data message. In some embodiments, the code NCO phase (part of input 428) is generated by the VDLL 420.

Various aspects of the combined VDLL and RTK-VPLL receiver system 100, according to some embodiments, are described below in the context of the flowcharts shown in FIGS. 5A-5I. This includes details of the RTK-VPLL Kalman Filter 448, initialization of the RTK-VPLL (indicated by the dotted black lines 494), the dynamic model (time update) of the RTK-VPLL, RTK-VPLL Filter Residuals, Residual Variances and Measurement Update and RTK-VPLL Carrier Phase Prediction and NCO Calculation (Carrier Loop Closure), as indicated by the dashed black line 492.

FIGS. 5A-5I depict a flowchart of a method 500 for combined Doppler-aided VDLL and RTK-VPLL measurement, according to some embodiments. Method 500 may be implemented by mobile object system 200, under the control of instructions stored in memory 210 (FIG. 2A) that are executed by one or more processors (202, FIG. 2A) of moving object system 200. Each of the operations shown in FIGS. 5A-5I corresponds to computer readable instructions stored in a computer readable storage medium of memory 210 in mobile object system 200. The computer readable instructions are in source code, assembly language code, object code, or other instruction format that is interpreted and/or executed by the one or more processors 202 of mobile object system 200.

Mobile object system 200 (FIG. 2A) receives (502), via the satellite receiver 204 (FIG. 2A), satellite navigation signals from satellites 115 (FIG. 1). The satellite navigation signals are measured, or processed to produce measurements, to produce satellite navigation data for mobile object 110 (506). In one example, the satellite navigation data for mobile object 110 includes, for each satellite from which satellite navigation signals are received, a pseudorange measurement and phase measurements for one or more satellite signals, such as the GPS L1 signal, for single frequency satellite receivers, or the L1 and L2 GPS signals, for dual frequency satellite receivers.

Mobile object 110 also receives (504), via communication channel 150 and communications receiver 206 (FIG. 2A), stationary base data from stationary base 120 (FIG. 1). The stationary base data includes satellite measurement data of stationary base 120. The satellite measurement data is generated by stationary base 120 from the satellite navigation signals it receives from a number of (generally four or more) satellites 115. In some embodiments, as described further below with reference to FIG. 5D, the stationary base data received from the stationary base station 120 includes, for each of four or more channels (e.g., for each of four of more satellites from which satellite navigation signals are received), a base station carrier phase measurement and base station Doppler frequency information for the satellite corresponding to the channel. In some embodiments, as described further below with reference to FIG. 5E, the base data received from the stationary base station 120 includes, satellite measurement data including base station code phase measurements and base station carrier phase measurements for a number of satellites, Doppler frequency information, and position-related information of the stationary base station 120. The data received from the base station 120 is stored in memory 210 of mobile object system 200.

In some embodiments, one or more determining modules 230 of the mobile object system 200 generates (506), from the received satellite navigation signals, satellite navigation data for the mobile object including code phase estimates (described further below with reference to FIG. 5C) and carrier phase estimates (described further below with reference to FIG. 5B) for the plurality of satellites 115. In these embodiments, the determining modules 230 compute (508) position, velocity and time estimates for the mobile object in accordance with the code phase estimates and carrier phase estimates.

In accordance with the computed position, velocity and time estimates for the mobile object, mobile object system 200 performs a navigation function (509) for the mobile object 110. In some embodiments, a navigation application 218 performs the navigation function (509) by directing the mobile object 110 along a path. In some embodiments, the navigation application 218 maintains the mobile object 110 with a fixed orientation and distance relative to another mobile object. In some of these embodiments, the navigation application 218 coordinates with steering or propulsion control module 220 to control movement of the mobile object 110. In some embodiments, mobile object system 200 (FIG. 2A) transmits a signal (e.g., using communication interface 208) to home system 160 (FIG. 1) to report information corresponding to the relative position vector and/or the position of mobile object 110 to the home system 160.

It is noted that in the descriptions that follow, although some mathematical equations describe only one instance of computations performed by the VPLL or VDLL module, such as by using subscript 1 or superscript 1 to describe functions of the first channel, it is to be understood that multiple corresponding instances of the computation represented by the equation are executed by the respective modules, such as by channels, with appropriate adjustments to the various parameters. For example, Equation (7) below describes a carrier phase discriminator value for the first channel, using the $\delta\phi_1$ parameter as the right hand side of the equation. It is to be understood, however, that three or more other channels 402 in FIG. 4A or FIG. 4B use corresponding inputs for corresponding calculations. For example, channel 2 would use $\delta\phi_2$, channel 3 would use $\delta\phi_3$, and channel 4 would use $\delta\phi_4$.

1. RTK Vector Phase Locked Loop (RTK-VPLL)

Figure 5D:
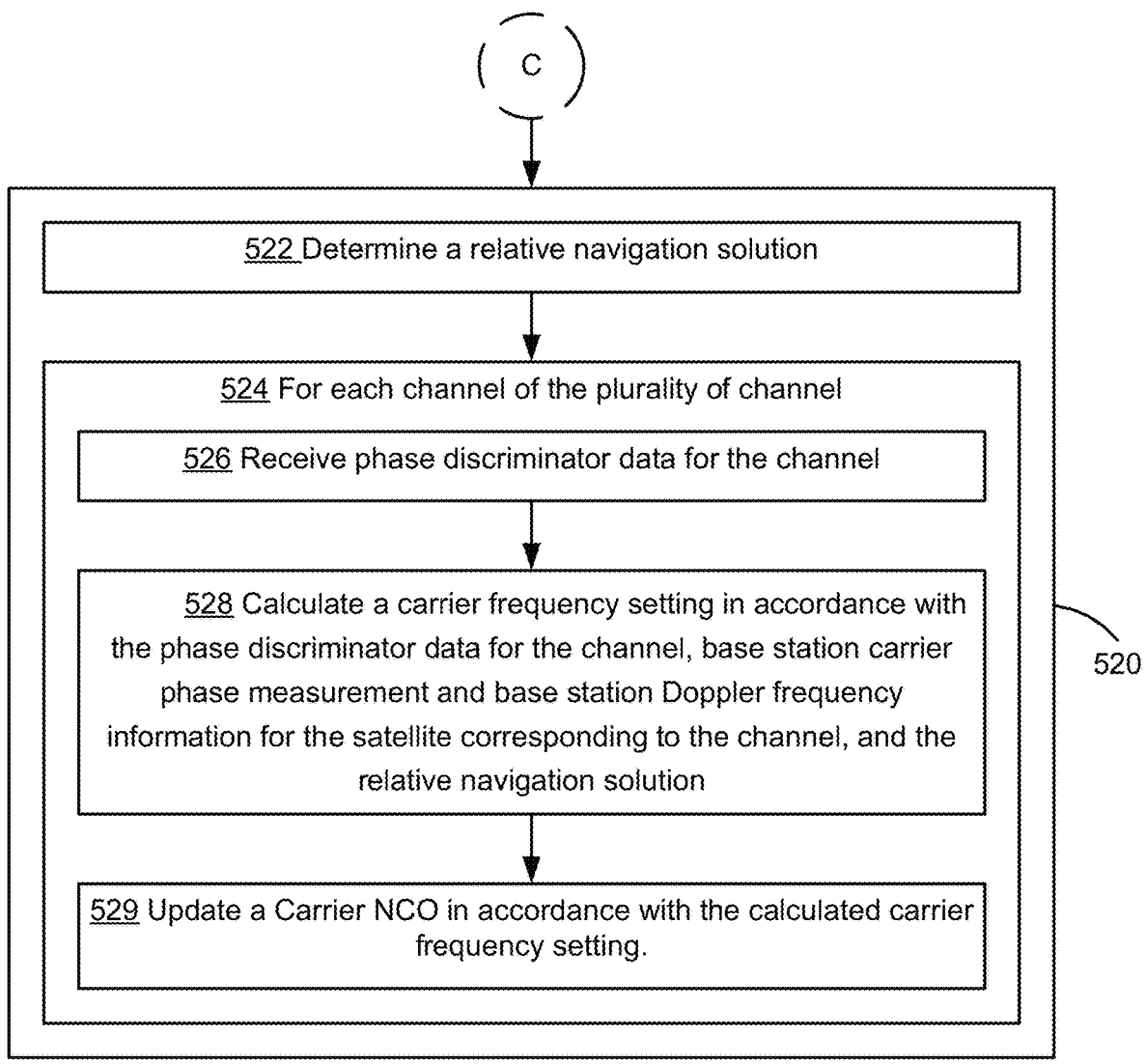
Figure 5E:
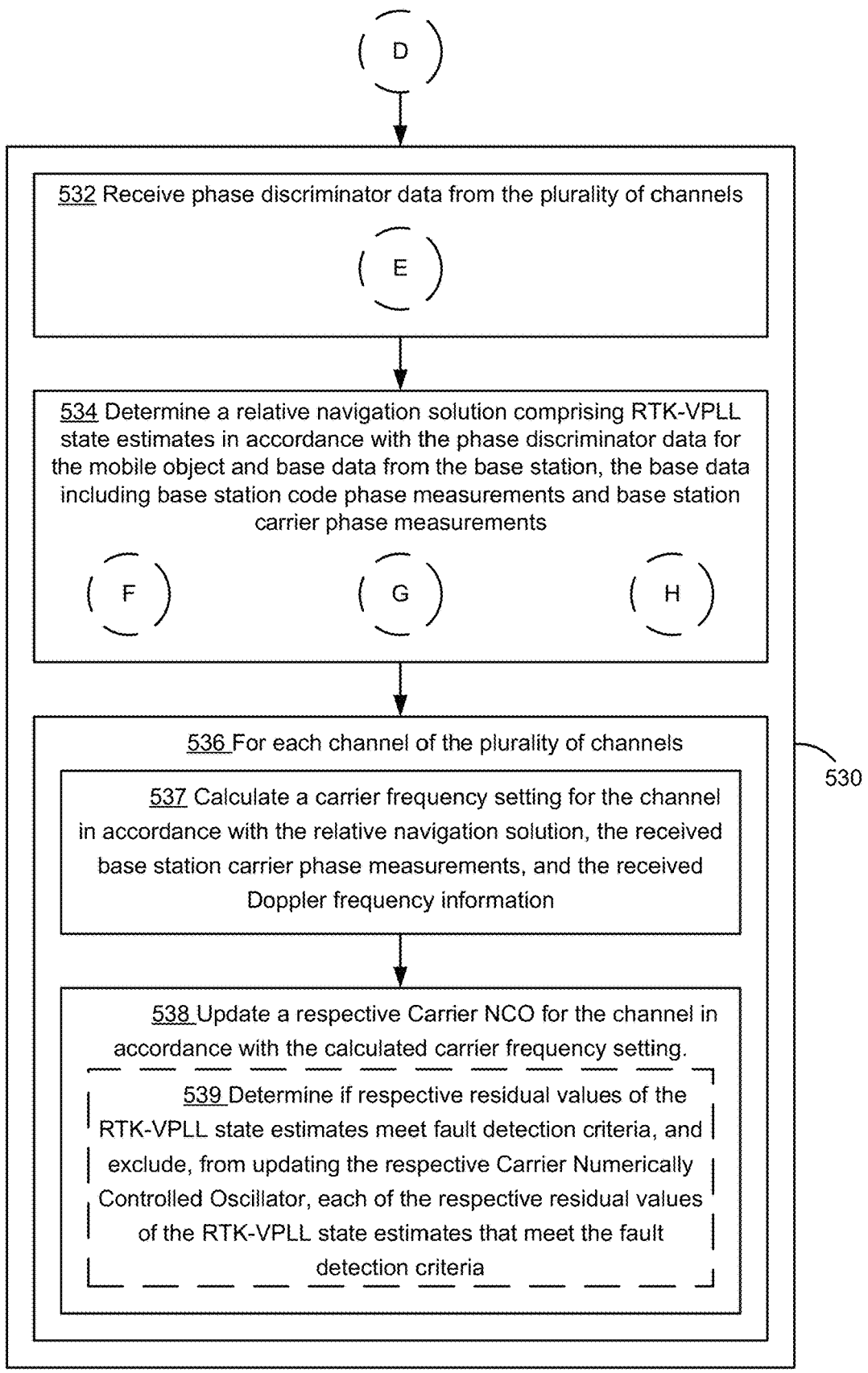
Figure 5F:
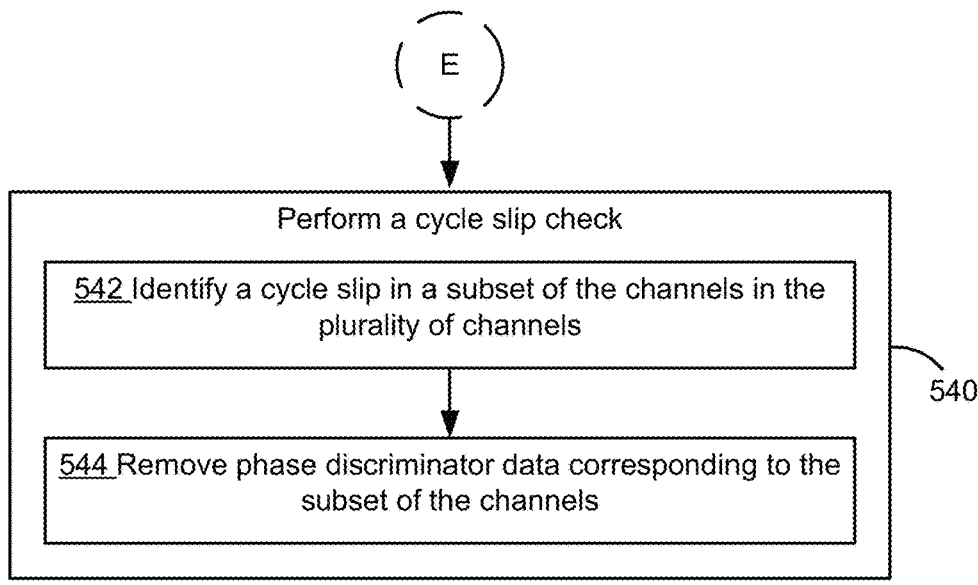
Figure 5G:
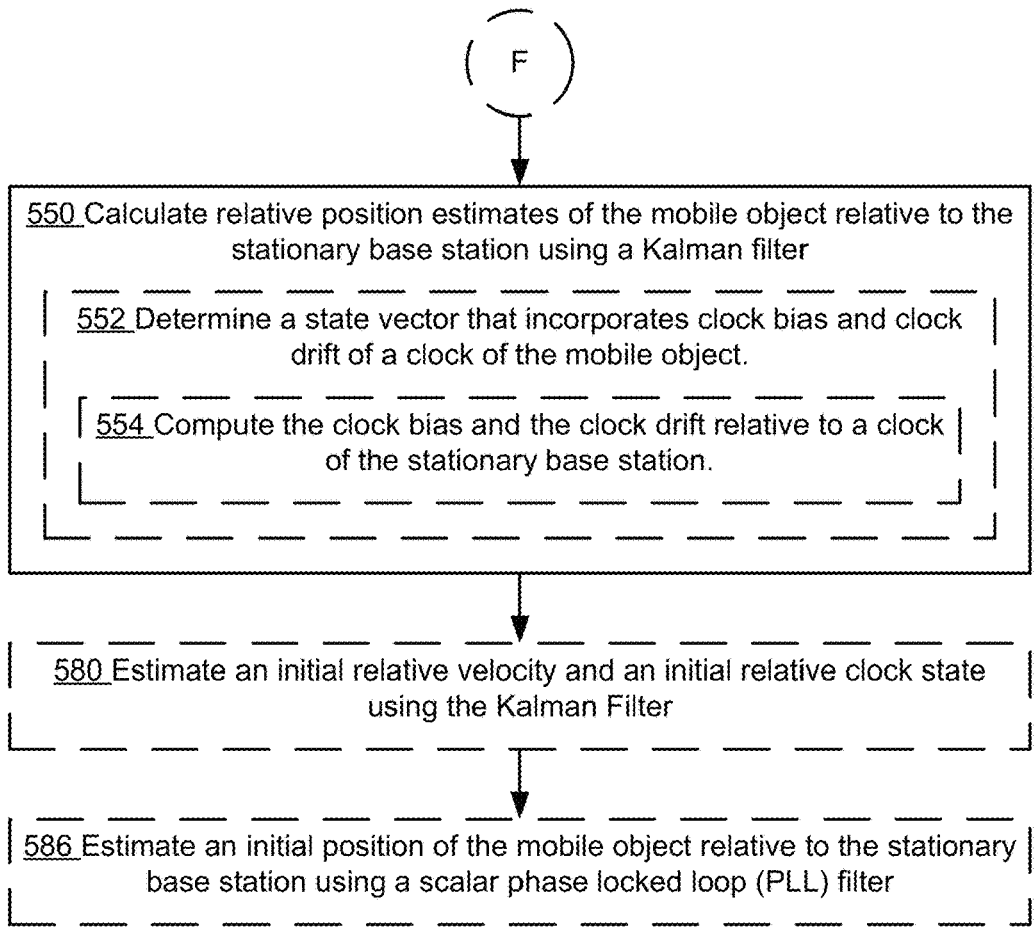

Mobile object system 200 performs (510) a Real-Time-Kinematics Vector Phase Locked Loop (RTK-VPLL) computation process (using the system architecture described above in reference to FIG. 4B) to generate carrier phase estimates for the plurality of satellites. FIGS. 5D and 5E depict the various steps in the RTK-VPLL computation process in accordance with some embodiments. The following description is in reference to both FIGS. 5D and 5E.

In some embodiments, the determining module 230 determines (step 522 in FIG. 5D or step 534 in FIG. 5E) a relative navigation solution (sometimes herein called the RTK-VPLL state estimate) using a RTK-VPLL Kalman Filter (shown as block 448 in FIG. 4B, herein also called the Kalman filter). In some embodiments, the Kalman filter calculates (550, FIG. 5G) relative position estimates of the mobile object relative to stationary base station. Further, in these embodiments, the Kalman filter 448 determines (552) a state vector that incorporates clock bias and clock drift of a clock of the mobile object. In some of these embodiments, the Kalman filter 448 computes (554) the clock bias and the clock drift relative to a clock of the stationary base station. In some embodiments, the Kalman filter 448 is used to maintain high precision relative position estimates in RTK-VPLL navigation processor 440 (FIG. 4A). In these embodiments, the Kalman filter 448 uses a state vector, seen in Equation (2) below, that includes three dimensional ECEF relative position vector errors ($\delta x$, $\delta y$, $\delta z$), three dimensional relative velocity errors ($\delta\dot{x}$, $\delta\dot{y}$, $\delta\dot{z}$), a relative clock bias error ($\delta cb$), and a relative clock drift error ($\delta\dot{cb}$).

$$X = [\delta x\ \delta y\ \delta z\ \delta\dot{x}\ \delta\dot{y}\ \delta\dot{z}\ \delta cb\ \delta\dot{cb}]^T \quad\quad 2$$

In some embodiments, the Kalman filter 448 also estimates (580 in FIGS. 5G and 5I) an initial relative velocity ($v_{rb}$) and an initial relative clock state ($b_{rb}$).

A. RTK-VPLL Initialization

In some embodiments, RTK module 233 implements the RTK algorithm (shown as block 480 in FIG. 4B) and is used to calculate (570, FIG. 5I) an initial position of the mobile object 110 relative to the stationary base station 120. In some embodiments, the RTK module 233 receives (572) position-related information of the stationary base station and code phase estimates and carrier phase estimates from the plurality of channels (indicated by signals 484 in FIG. 4B). The RTK module 233, using the RTK algorithm, estimates (574) the initial position of the mobile object 110 relative to the stationary base station 120 in accordance with the position-related information of the stationary base station and the received code phase estimates and carrier phase estimates.

In some embodiments, the RTK algorithm is a multistep procedure. A first step is to estimate carrier ambiguities as decimal values. A Kalman filter (such as the one previously described) is used to iteratively estimate the ambiguities along with the relative position vector and clock bias. The pseudorange and carrier phase measurements from rover receiver 302 and base station receiver 306 are combined to perform the measurement update of the Kalman filter. The Kalman filter mean and covariance of the carrier ambiguities are then used to intelligently round the decimal estimate to integer values using an algorithm called the Least-Squares Ambiguity Decorrelation Adjustment (LAMBDA) method. Finally, a high precision relative position vector (HPRPV) is calculated using the integer value ambiguities and the carrier phase measurements from the two receivers (also called the double difference least squares solution). The relative position states ($r_{rb}$ part of output 486 in FIG. 4B) of the RTK-VPLL are initialized with the HPRPV.

In some embodiments, the RTK algorithm calculates a vector of fixed integer single difference carrier ambiguities (N), for satellite navigation signals from satellites 1 to m, where m is an integer greater than or equal to four, as seen in Equation (3) below. In some embodiments, the quantity N is recorded (e.g., in memory 210) and is used as a known quantity in the carrier phase prediction algorithm 446 of the RTK-VPLL algorithm. The single difference measurement is described in detail in section 5.2.2. of Scott M. Martin, "GPS Carrier Phase Tracking in Difficult Environments Using Vector Tracking for Precise Positioning and Vehicle Attitude Estimation," Dissertation Thesis, Auburn University, May 6, 2017, hereinafter called the Martin thesis, which is hereby incorporated by reference.

$$N = \begin{bmatrix} N_{r,b}^1 \\ \vdots \\ N_{r,b}^m \end{bmatrix} \quad\quad 3$$

In some embodiments, the RTK algorithm is also used to estimate an initial relative velocity ($v_{rb}$, output 486 in FIG. 4B) and relative clock states ($b_{rb}$, output 486 in FIG. 4B), which are used to initialize the RTK-VPLL navigation processor 440. Since the relative velocity and relative clock states are estimated in the RTK algorithm along with the decimal estimates of the carrier ambiguities (N), in some embodiments, the RTK-VPLL navigation solution is updated several times before the loop closure aspect of the RTK-VPLL is initiated. In some embodiments, the updates are performed at the update rate of the original RTK algorithm 480 using the single difference carrier phase measurements (N) from the rover receiver 302 and base receiver 306. This step allows the clock bias estimate ($b_{rb}$) in particular to converge to a more precise value that may be used to predict the received carrier phase and close the phase tracking loop.

B. RTK-VPLL Dynamic Model (Time Update)

In some embodiments, the RTK-VPLL system is designed assuming that the base receiver 306 is stationary with good sky visibility (as illustrated in FIG. 3A). Accordingly, any change in the relative position and velocity are the result of the motion of the rover receiver 302. Therefore, the dynamic model used in the time update of the Kalman Filter 448 is generally the same in the VDLL 420 and the RTK-VPLL 440. The discrete dynamic model used to propagate the RTK-VPLL navigation solution is shown in Equation (4) below.

$$X_{k+1} = \Phi_{k,k+1} X_k + Q_k \tag{4.a}$$

$$\Phi_{k,k+1} = \begin{bmatrix} \alpha_k & 0_{2\times 2} & 0_{2\times 2} & 0_{2\times 2} \\ 0_{2\times 2} & \alpha_k & 0_{2\times 2} & 0_{2\times 2} \\ 0_{2\times 2} & 0_{2\times 2} & \alpha_k & 0_{2\times 2} \\ 0_{2\times 2} & 0_{2\times 2} & 0_{2\times 2} & \alpha_k \end{bmatrix} \tag{4.b}$$

$$\alpha_k = \begin{bmatrix} 1 & \Delta t \\ 0 & 1 \end{bmatrix} \tag{4.c}$$

$$Q_k = \begin{bmatrix} Q_x & 0_{2\times 2} & 0_{2\times 2} & 0_{2\times 2} \\ 0_{2\times 2} & Q_y & 0_{2\times 2} & 0_{2\times 2} \\ 0_{2\times 2} & 0_{2\times 2} & Q_z & 0_{2\times 2} \\ 0_{2\times 2} & 0_{2\times 2} & 0_{2\times 2} & 2Q_{cb} \end{bmatrix} \tag{4.d}$$

$$Q_x = Q_y = Q_z = \begin{bmatrix} \frac{\sigma^2 \Delta t^3}{3} & \frac{\sigma^2 \Delta t^2}{2} \\ \frac{\sigma^2 \Delta t^2}{2} & \sigma^2 \Delta t \end{bmatrix} \tag{4.e}$$

$$Q_{cb} = \begin{bmatrix} \sigma_b^2 T + \frac{\sigma_r^2 T^3}{3} & \frac{\sigma_r^2 T^2}{2} \\ \frac{\sigma_r^2 T^2}{2} & \sigma_r^2 T \end{bmatrix} \tag{4.f}$$

Equation (4) is derived from the kinematic relationship of the states and assumes that the velocity states are driven by zero mean Gaussian white noise. Equation (4.e) shows that the variance on the platform acceleration is assumed to be the same in all directions x, y and z. In some embodiments, platform constraints are used when selecting these values. In the equations above, the process noise matrix reflects the fact that the relative clock bias ($b_{rb}$) and drift ($\dot{b}_{rb}$) include the effects of both the rover 302 and base 306 clocks. Equation (4.f) assumes that the clock model parameters (e.g. $\sigma_b$, $\sigma_r$) are the same for the rover 302 and base 306 clocks and that the stochastic errors are uncorrelated.

C. RTK-VPLL Filter Residuals, Residual Variances and Measurement Update

In some embodiments, the navigation solution of the RTK-VPLL is initialized with position information that is accurate enough to predict the received carrier phase. To maintain this level of accuracy, the Kalman filter residuals are typically as accurate as the single difference carrier phase measurements used to estimate the HPRPV. The carrier phase discriminator 406 provides a range error measurement 407 with an accuracy of a few millimeters. The residual ($\delta\phi$) of the RTK-VPLL Kalman Filter 448 is shown in Equation (5) below, according to some embodiments.

$$\delta\phi = \lambda_{L1} \operatorname{atan}\left(\frac{QP}{IP}\right) \tag{5}$$

In these embodiments, a Costas carrier discriminator is used to calculate the residual carrier phase error, and the wavelength of the GPS L1 signal is used to convert the residual carrier phase error to units of meters. A primary error source in the carrier tracking loop is thermal noise. Accordingly, the measurement uncertainty of the carrier discriminator 406 is calculated as a function of the carrier to noise ratio of the signal from each channel. In some embodiments, carrier phase error measurement noise is modeled based on a suggestion in G. A. McGraw and M. S. Braasch, "Modeling of tracking Loop noise and dynamics for efficient simulation of the spread spectrum ranging systems," *IEEE Transactions on Aerospace and Electronic Systems*, 34(3): 1003-1008, July 1998, and given in Equation (6) below.

$$\sigma_\phi^2 = \frac{\left(\frac{\lambda_{L1}}{2\pi}\right)}{2T\left(\frac{C}{N_0}\right)} \tag{6}$$

In some embodiments, the RTK-VPLL measurement updates are performed at the end of the integrate and dump period on each channel. Therefore, the measurement vector z only includes a single carrier phase discriminator for the current channel ($\delta\phi_1$ for the first channel) as seen in Equation (7) below.

$$z = [\delta\phi_1] \tag{7}$$

It is noted that the calculation of this measurement vector is preceded by receiving phase discriminator data, either for one channel at a time (step 526 in FIG. 5D) or for the plurality of channels en masse (step 532 in FIG. 5E) followed by selecting the respective phase discriminator data for the computation in Equation (7).

The measurement matrix maps the state errors into the measurement domain using the line of sight unit vectors from satellite to receiver. The matrix is defined in Equation (8) below, according to some embodiments.

$$H = [a_x\ 0\ a_y\ 0\ a_z\ 0\ -1\ 0] \tag{8}$$

The column of negative one in Equation (8) relates the relative clock error to the carrier phase residual. The Kalman filter measurement update is performed using the traditional equations defined in Equation (9) below, in accordance with some embodiments.

$$K_k = P_k H^T (H P_k H + R_k)^{-1} \tag{9.a}$$

$$P_k = (I - K_k H) P_k \tag{9.b}$$

$$X_k = X_k + K_k z_k \tag{9.c}$$

Subsequent to determining (step 522 in FIG. 5D or step 534 in FIG. 5E) the relative navigation solution comprising the RTK-VPLL state estimates discussed above, the RTK-VPLL computation process calculates (step 528 in FIG. 5D or step 537 in FIG. 5E) a carrier frequency setting for each channel in accordance with the relative navigation solution, the received base station carrier phase measurements and the received Doppler frequency information. In some embodiments, a phase prediction algorithm (module 446 in FIG. 4B) predicts the carrier phase of the received signal at the end of the current integration period. The current integration period refers to the integration period that begins directly after the RTK-VPLL measurement update. In some embodiments, the phase prediction algorithm 446 begins with the propagation of the base station carrier phase from the time of the measurement (indicated by time t) to the end of the current integration period (indicated by $t_{k+1}$). The updated base station carrier phase is calculated using a computational process represented by Equation (10) below, according to some embodiments.

$$\hat{\phi}_{b_{k+1}} = \tilde{\phi}_{b_t} + f_{D_{b_t}}(t_{k+1} - t) \qquad 10$$

The k notation is not used with the base station carrier phase measurement because the base station measurements are synchronized to GPS time and are not synchronous with the end of an integration period in the rover tracking channels 402. In Equation (10), $\phi_{b_t}$ is the most recent base station carrier phase measurement, $$f_{D_{b_t}}$$

is the most recent Doppler measurement from the base station, and $t_{k+1}$ is the receive time of the end of the current integration period.

Next, the phase prediction algorithm 446 projects forward the RTK-VPLL navigation states forward to time $t_{k+1}$ using the state transition matrix defined in Equation (4.b) above, according to some embodiments. The error state mean and covariance are not updated at this time. The predicted states are used along with the base receiver predicted carrier phase ($\hat{\phi}_{b_{k+1}}$) and the carrier ambiguity to calculate the predicted carrier phase ($\hat{\phi}_{r_{k+1}}$) at the rover at time $t_{k+1}$ using a computational process represented by Equation (11) below, according to some embodiments.

$$\hat{\phi}_{r_{k+1}} = \hat{\phi}_{b_{k+1}} + \frac{1}{\lambda}\left(\vec{a}_{k+1}\hat{\vec{r}}_{r,b_{k+1}} + c\hat{b}_{r,b_{k+1}}\right) + N_{r,b} \qquad 11$$

In some embodiments, the predicted state estimates are used to calculate the line of sight phase difference between the rover receiver 302 and base receiver 306, represented in Equation (11) by the middle term of the right hand side. In Equation (11), $\vec{a}_{k+1}$ is the three dimensional line of sight unit vector, $\hat{\vec{r}}_{r,b_{k+1}}$ is the predicted three dimensional relative position vector, and $c\hat{b}_{r,b_{k+1}}$ is the predicted relative clock bias. The carrier ambiguity $N_{r,b}$ (input 486 in FIG. 4B) initialized using the scalar RTK algorithm is assumed to be constant during RTK-VPLL 440 operation, according to some embodiments.

In some embodiments, the total phase change during the integration period of the sampled signal is determined using both the Doppler affect and the intermediate frequency of the GPS front end. To calculate the desired carrier frequency setting $f_\phi$ for the carrier NCO 410, the total phase change over the integration period is divided by the change in receiver time. The formula is defined in the Equation (12) below, according to some embodiments.

$$f_\phi = \frac{f_{IF}(t_{k+1} - t_k) - (\hat{\phi}_{r_{k+1}} - \phi_{r_k})}{t_{k-1} - t_k} \qquad 12$$

In this equation, $f_{IF}$ is the intermediate frequency of the GPS front end and $\phi_{r_k}$ is the current carrier phase measurement of the rover receiver 302. It is noted that the change in carrier phase is subtracted because the Doppler frequency decreases for increasing range between transmitter and receiver.

Subsequent to the carrier frequency calculation above, the VPLL Navigation Module 235 updates the carrier NCO 410 (step 529 in FIG. 5D or step 538 in step 5E) with the desired frequency setting (shown as dashed black line 447 in FIG. 4B), according to some embodiments.

D. RTK-VPLL Cycle Slip Check

As described previously with reference to step 532, carrier phase discriminator data is received from each channel and used in the Kalman filter updates. In some embodiments, when receiving the phase discriminator data, the RTK-VPLL receiver system performs (540, FIG. 5F) a cycle slip check as follows.

Cycle slips in the carrier phase measurements of the rover receiver 302 have the potential to cause the RTK-VPLL navigation filter 440 to diverge from the true relative position and clock states. A cycle slip will manifest as an error between the measured range and the predicted range (using the state vector) for rover to base. As a result, the navigation solution accuracy will be negatively affected, and the prediction of the received carrier phase will degrade. Alternatively, it is possible to correct the slip if it can be detected before the navigation solution is affected.

In some embodiments, a cycle slip detection algorithm identifies (542) a cycle slip in a subset of the channels that are tracking satellite signals, and removes (544) the carrier discriminator provided by those channels from the Kalman filter measurement update. The cycle slip check is performed at the update rate of the original RTK algorithm using the latest time synchronized rover and base station carrier phase measurements. The first step of the process is to propagate the RTK-VPLL state estimates $X_k$ to the time of the current measurements using a computation represented by Equation (13) below, according to some embodiments.

$$X(t) = \Phi_{t,t_k} X_k \qquad 13$$

The state transition matrix $\Phi_{t,t_k}$ was defined in Equation (4) above, t is the measurement epoch synchronized to GPS time, and $t_k$ is the current best estimate of the RTK-VPLL state vector.

The cycle slip test statistic is calculated by comparing the measured single difference carrier phase to the single difference carrier phase predicted by the RTK-VPLL state estimates using a computation represented by Equation (14) below, according to some embodiments.

$$\chi(t) = \Delta\phi_{r,b}(t) + \frac{1}{\lambda}\left(\vec{a}_t \hat{\vec{r}}_{r,b_t} + \hat{c}b_{r,b_t}\right) + N_{r,b} \qquad 14$$

In this equation, $\Delta\phi_{r,b}$ is the single difference carrier phase measurement from the rover and base receivers. The middle term is the line of sight delta range as seen previously in Equation (11). Again, $\vec{a}_t$ represents the three dimensional line of sight unit vectors, $\hat{\vec{r}}_{r,b_t}$ represents the propagated relative position estimates, and $\hat{c}bg_{r,b_t}$ represents the propagated relative clock bias estimate.

The test statistic $\chi(t)$ above is calculated in units of cycles, and during normal operating conditions this value is typically zero mean with a standard deviation of approximately one percent of a cycle. A Costas carrier phase discriminator has an effective range of one quarter of a cycle. Therefore, if the error of the carrier phase replica in one channel is larger than one quarter cycle, the replica will converge to the next half cycle (i.e. a one half cycle slip). Based on the limits of the carrier discriminator, in some embodiments, a threshold of one quarter cycle is selected for comparison with the test statistic. If the test value is greater than one quarter cycle on a channel, the carrier discriminator from that channel is not used to update the RTK-VPLL navigation solution. Assuming there are other channels that are capable of maintaining the accuracy of the RTK-VPLL estimates, the fault channel should return to the cycle corresponding to the original carrier integer ambiguity.

E. RTK-VPLL Fault Detection and Exclusion

Some embodiments of the RTK-VPLL receiver implement (539) an additional fault detection approach to prevent large errors from impacting the receiver operation. The determining module 230 (or the VPLL Navigation module 235) determines if respective residual values of the RTK-VPLL state estimates meet a fault detection criteria, and exclude, from updating the respective Carrier Numerically Controlled Oscillator, each of the respective residual values of the RTK-VPLL state estimates that meet the fault detection criteria. In some embodiments, a state estimate meets the fault detection criteria if a normalized value of the state estimate's residual is larger than (or larger than or equal to) a test threshold value.

In some embodiments, the determining module 230 calculates a normalized innovation on each Kalman filter residual before it is used to update the state estimates. The normalized innovation $y_i$ is calculated by dividing the residual by the expected standard deviation of the residual as seen in Equation (15) below, according to some embodiments.

$$y_i = \left| \frac{z_i}{\sqrt{H_i P H_i^T + R_{i,i}}} \right| \qquad 15$$

The residual standard deviation is a function of the state uncertainty and measurement uncertainty. Nominally, the normalized residual follows a Gaussian distribution with unit variance. A test threshold is selected to produce a desired probability of false alarm. A threshold of 3 corresponds to a false alarm rate of approximately 0.3 percent. In some embodiments, the cycle slip detection algorithm described previously is used for fault detection. The normalized innovation is used to detect large errors using very low false alarm rate and therefore, in some embodiments, the threshold is set to 5, which corresponds to a false alarm rate of approximately 1 in 1.75 million.

2. Vector Delay Locked Loop (VDLL)

Mobile object system 200 performs (590) a Vector Delay Locked Loop (VDLL) computation process using the VDLL navigation processor 420 (FIG. 4A) to generate code phase estimates for the plurality of satellites. The VDLL Navigation module 235 coordinates with the measurement module 231 (including channels 232) to generate the code phase estimates.

In some embodiments, the VDLL computation process includes determining (592) a global navigation solution, using the VDLL Navigation Module 234, details of which are further described below. In some embodiments, the VDLL 234 receives (594) code discriminator data 422 from the respective discriminator module 406 in a plurality of channels 402 associated with a plurality of satellites, respective channel configured to track signals received by the mobile object from a corresponding number of satellites. In these embodiments, the VDLL 234 also receives corresponding Doppler frequency information 424 for each of the plurality of channels. In these embodiments, in accordance with the received code discriminator data, the received Doppler frequency information, and the global navigation solution, the VDLL Navigation Module 234 updates (596) a respective Code Numerically Controlled Oscillator 408 for a respective channel in the plurality of channels, as illustrated by the arrow 426 in FIG. 4A. The rest of this section details the determination (592) of the navigation solution by the VDLL 420, according to some embodiments.

In some embodiments, the VDLL 420 is implemented as an error state Kalman filter. The VDLL implementation described here follows the work by Matthew Lashley (*Modeling and Performance Analysis of GPS Vector Tracking Algorithms*, PhD Dissertation, Auburn University, 2009) and Benjamin Clark (*Fault Detection and Exclusion in Deeply Integrated GPS/INS Navigation*, PhD Dissertation, 2012), which is hereby incorporated by reference, with a modification to the measurement update. The states of this filter, represented by X in Equation 16, do not drive the carrier NCO, and the carrier frequency discriminator is not used to update the navigation states. The state vector includes three dimensional position and velocity errors, as well as clock bias and clock drift errors as seen in Equation (16) below, according to some embodiments.

$$X = \begin{bmatrix} \delta x \\ \delta \dot{x} \\ \delta y \\ \delta \dot{y} \\ \delta z \\ \delta \dot{z} \\ \delta cb \\ \delta \dot{c}b \end{bmatrix} \qquad 16$$

An estimate of position and velocity is maintained by applying the error correction to the state estimate after each time and measurement update of the Kalman filter. The position and velocity are estimated in ECEF coordinates, and the clock bias and clock drift are estimated in units of meters and meters per second, respectively, according to some embodiments.

A. VDLL Dynamic Model

In some embodiments, a kinematic model is again used to propagate the Kalman filter state mean and covariance. The state transition and process noise matrices are defined in Equation (17) below, according to some embodiments.

$$X_{k+1} = \Phi_{k,k+1} X_k + Q_k \qquad 17.\text{a}$$

$$\Phi_{k,k+1} = \begin{bmatrix} \alpha_k & 0_{2 \times 2} & 0_{2 \times 2} & 0_{2 \times 2} \\ 0_{2 \times 2} & \alpha_k & 0_{2 \times 2} & 0_{2 \times 2} \\ 0_{2 \times 2} & 0_{2 \times 2} & \alpha_k & 0_{2 \times 2} \\ 0_{2 \times 2} & 0_{2 \times 2} & 0_{2 \times 2} & \alpha_k \end{bmatrix} \qquad 17.\text{b}$$

$$\alpha_k = \begin{bmatrix} 1 & \Delta t \\ 0 & 1 \end{bmatrix} \qquad 17.\text{c}$$

$$Q_k = \begin{bmatrix} Q_x & 0_{2 \times 2} & 0_{2 \times 2} & 0_{2 \times 2} \\ 0_{2 \times 2} & Q_y & 0_{2 \times 2} & 0_{2 \times 2} \\ 0_{2 \times 2} & 0_{2 \times 2} & Q_z & 0_{2 \times 2} \\ 0_{2 \times 2} & 0_{2 \times 2} & 0_{2 \times 2} & Q_{cb} \end{bmatrix} \qquad 17.\text{d}$$

$Q_x$, $Q_y$, $Q_z$, and $Q_{cb}$ are defined below in Equations (18), according to some embodiments. The standard Kalman filter time update equations defined in Equation (19) below are used to propagate the filter mean and covariance, according to some embodiments.

In some embodiments, the state transition matrix and discrete process noise model is determined by truncating the Taylor series expansion of the dynamic equations to first order. The resulting discrete model, seen in Equation (18) below is used to propagate the estimated mean and covariance in the standard Kalman filter time update, according to some embodiments.

$$X_{k+1} = \Phi_{k,k+1} X_k + Q_k \qquad 18.a$$

$$\Phi_{k,k+1} = \begin{bmatrix} \alpha_k & 0_{2\times2} & 0_{2\times2} & 0_{2\times2} \\ 0_{2\times2} & \alpha_k & 0_{2\times2} & 0_{2\times2} \\ 0_{2\times2} & 0_{2\times2} & \alpha_k & 0_{2\times2} \\ 0_{2\times2} & 0_{2\times2} & 0_{2\times2} & \alpha_k \end{bmatrix} \qquad 18.b$$

$$\alpha_k = \begin{bmatrix} 1 & \Delta t \\ 0 & 1 \end{bmatrix} \qquad 18.c$$

$$Q_k = \begin{bmatrix} Q_x & 0_{2\times2} & 0_{2\times2} & 0_{2\times2} \\ 0_{2\times2} & Q_y & 0_{2\times2} & 0_{2\times2} \\ 0_{2\times2} & 0_{2\times2} & Q_z & 0_{2\times2} \\ 0_{2\times2} & 0_{2\times2} & 0_{2\times2} & Q_{cb} \end{bmatrix} \qquad 18.d$$

$$Q_x = \begin{bmatrix} \sigma_x^2 \frac{\Delta t^3}{3} & \sigma_x^2 \frac{\Delta t^2}{2} \\ \sigma_x^2 \frac{\Delta t^2}{2} & \sigma_x^2 \Delta t^2 \end{bmatrix} \qquad 18.e$$

$$Q_y = \begin{bmatrix} \sigma_y^2 \frac{\Delta t^3}{3} & \sigma_y^2 \frac{\Delta t^2}{2} \\ \sigma_y^2 \frac{\Delta t^2}{2} & \sigma_y^2 \Delta t^2 \end{bmatrix} \qquad 18.f$$

$$Q_z = \begin{bmatrix} \sigma_z^2 \frac{\Delta t^3}{3} & \sigma_z^2 \frac{\Delta t^2}{2} \\ \sigma_z^2 \frac{\Delta t^2}{2} & \sigma_z^2 \Delta t^2 \end{bmatrix} \qquad 18.g$$

$$Q_{cb} = \begin{bmatrix} \frac{h_2}{2}\Delta t + \frac{2}{3}\pi^2 h_4 \Delta t^3 + 2h_3 \Delta t^2 & \pi^2 h_4 \Delta t^2 + 2h_3 \Delta t \\ \pi^2 h_4 \Delta t^2 + 2h_3 \Delta t & 2\pi^2 h_4 \Delta t + 2h_3 \end{bmatrix} \qquad 18.h$$

In Equations (18.e-18.h) above, $Q_x$, $Q_y$, and $Q_z$ are the expected values of $w_x^2$, $w_y^2$, $w_z^2$ respectively, according to some embodiments. In some embodiments, each of the acceleration uncertainties is tuned individually to reflect the likely vehicle dynamics if they are known to differ in certain directions. The $h_2$, $h_3$, and $h_4$ values are determined based on the specification of the receiver clock. In some embodiments, h2, h3 and h4 are determined as described in Section 3.5.1 of the Martin thesis (incorporated by reference above). The Kalman time update of the state mean and covariance is calculated using Equations (19) below, according to some embodiments.

$$X_{k+1} = \Phi_{k,k+1} X \qquad 19.a$$

$$P_{X_{k+1}} = \Phi_{k,k+1} P_{X_k} \Phi_{k,k+1}^T + Q_k \qquad 19.b$$

B. VDLL Filter Residuals

In some embodiments, the navigation processor of a vector tracking receiver is updated with either correlator outputs or discriminator outputs. In some embodiments, the VDLL navigation processor 420 of the vector tracking receiver 302 uses code phase discriminator outputs to generate range error measurements 407 to update the navigation filter 448. In some embodiments, the current carrier NCO value is also used to calculate range rate residuals. In some embodiments, each channel provides range and range rate error residual to update the VDLL navigation processor 420 at the end of each integration and dump period (20 ms, for example). The filter residuals are described by equations below.

The code phase error residual is calculated using Equation (20) below, according to some embodiments.

$$\delta\theta_{c_1} = \frac{1}{2} \frac{\varepsilon_1}{A_1} \beta \qquad 20$$

In Equation (20) above, $\beta$ is the CA code chip width ($\approx 293.05$ m in some embodiments), which is used to $\beta$ convert the code phase error from units of chips to meters. $\varepsilon_1$ is the early minus late power given by Equation (21) below, and $A_1$ is the average received signal power given by Equation (22) below, according to some embodiments.

$$\varepsilon_1 = IE^2 + QE^2 - IL^2 - QL^2 \qquad 21$$

$$A_1 = (IE+IL)^2 + (QE+QL)^2 - 4\eta^2 \qquad 22$$

Unlike a vector delay and frequency locked loop (VD-FLL) Kalman filter, the VDLL navigation processor 420 does not control the carrier NCO 410, as illustrated in FIG. 4A. Instead of using the carrier frequency discriminator to update the velocity and clock drift states, a range rate residual $\delta\dot{\rho}$ is calculated using the current NCO value that is controlled by the RTK-VPLL 440. The range rate residual is calculated by subtracting the range rate predicted by the current states of the navigation processor ($\hat{\dot{\rho}}$) from the measured range rate derived from the carrier NCO ($\tilde{\dot{\rho}}$) as seen in Equation (23) below, according to some embodiments.

$$\delta\dot{\rho}_1 = \tilde{\dot{\rho}}_1 - \hat{\dot{\rho}}_1 \qquad 23$$

In some embodiments, the calculation of $\hat{\dot{\rho}}$ is accomplished as described in Section 2.5.5 of the Martin thesis. In some embodiments, the measured range rate is calculated from the current carrier Doppler using Equation (24) below, according to some embodiments.

$$\tilde{\dot{\rho}}_1 = -\lambda f_{D_1} \qquad 24$$

In some embodiments, the carrier Doppler measurement is calculating by subtracting the front end intermediate frequency from the current carrier NCO value.

C. VDLL Residual Variances

In some embodiments, the expected variance of the range and range rate residuals is calculated as a function of the $C/N_0$ ratio from each channel. As described in Robert N. Crane, "A simplified method for deep coupling of GPS and inertial data," *Proceedings of the National Technical Meeting of the Institute of Navigation*, San Diego, Calif., January 2007, Institute of Navigation, which is hereby incorporated by reference in its entirety, the variance of the code phase discriminator based range residual is calculated using Equation (25) below.

$$\sigma_{\theta_c}^2 = \frac{\beta^2}{2(TC/N_0)^2} + \frac{\beta^2}{4TC/N_0} \qquad 25$$

As previously described, $\beta$ represents the CA code chip width and T is the integrate and dump period (20 ms in some embodiments).

Equation (26) below is used to calculate the measurement noise on the range rate residual, according to some embodiments.

$$\sigma_{\delta\dot{\rho}} = \left(\frac{\lambda_{L1}}{\pi T}\right)^2 \left(\frac{2}{(TC/N_0)^2} + \frac{2}{TC/N_0}\right) \qquad 26$$

In some embodiments, the wavelength of GPS L1 carrier ($\lambda_{L1}$) is used to convert the carrier frequency error variance to units of meter squared per second squared. In some embodiments, the variance due to code phase error is assumed to be negligible compared to the variance due to thermal noise.

D. VDLL Measurement Update

At the end of the integrate and dump period on each channel, the range and range rate residuals are calculated to form the measurement vector for the Kalman filter update. The measurement vector is given in Equation (27) below, according to some embodiments.

$$z = \begin{bmatrix} \delta\theta_{c_1} \\ \delta\rho_1 \end{bmatrix} \qquad 27$$

Differentiating the range and range rate predictions with respect to the state vector results in the measurement matrix, H, shown in Equation (28) below, according to some embodiments.

$$H = \begin{bmatrix} a_x & 0 & a_y & 0 & a_z & 0 & -1 & 0 \\ 0 & a_x & 0 & a_y & 0 & a_z & 0 & -1 \end{bmatrix} \qquad 28$$

$a_x$, $a_y$, and $a_z$ comprise the line of sight unit vector from satellite to receiver. In some embodiments, the end of the integration period is not synchronous across the channels, and therefore a correction is made to the measurement vector. The correction accounts for the change in the state vector that occurs between the code frequency prediction at the end of one integration period and the measurement update at the end of the next integration period. The correction is updated iteratively between measurement updates on each individual channel. In some embodiments, the correction is determined using techniques described by M. Lashley and D. Bevly in "Comparison in the performance of the vector delay/frequency lock loop and equivalent scalar tracking loops in dense foliage and urban canyon," *Proceedings of the 24th International RTechnical Meeting of the Satellite Division of the Institute of Navigation*, 2011, and by Brian Keyser in "Design and Implementation of a soc-based real-time vector tracking GPS receiver," Master's thesis, 2015. Both references are hereby incorporated in their entireties.

E. VDLL Code Phase Prediction and NCO Calculation

In some embodiments, a posteriori state estimates are used to predict the received time of the start of the next code period and calculate the desired code frequency for the code NCO. First, a prediction of the state vector at the end of the current integrate and dump period is calculated using the state transition matrix. Note that the state mean and covariance estimates are not propagated forward in this step because the filter time update is performed at the end of each integration period. The Kalman filter time update is performed at the end of the integrate and dump period. The state vector prediction and the predicted satellite positions are used to calculate a prediction of the pseudorange at the end of the current integration period as seen in Equation (29) below, according to some embodiments.

$$\hat{\rho}_{k+1} = \|\vec{r}_{s_{k+1}} - \hat{\vec{r}}_{r_{k+1}}\| + \hat{c}b_{k+1} \qquad 29$$

The subscript k+1 is used to denote the end of the current integration period where k is the current time. $\vec{r}_{s_{k+1}}$ is the three dimensional satellite position calculated at time k+1 using the decode ephemerides. The predicted three dimensional receiver position is represented by $\hat{\vec{r}}_{r_{k+1}}$, and $\hat{c}b_{k+1}$ is the predicted clock bias. The operator $\| \ \|$ represents the Euclidean norm.

The transmission time $t_{r_{k+1}}$ of the start of a code period is synchronized to GPS time, and is a known quantity based on the decoded navigation message and the code period counter in the receiver. The received time of the first sample of the code period starting at time k+1 is calculated using Equation (30) below, according to some embodiments.

$$\hat{t}_{r_{k+1}} = t_{t_{k+1}} + \hat{\rho}_{k+1} \qquad 30$$

At this point the start time (i.e. current receiver time $t_{r_{k+1}}$) and the predicted end time (i.e., current receiver time $\hat{t}_{r_{k+1}}$) of the current integration period are available. In some embodiments, the CA code chipping rate is $1.023 \times 10^6$, and the integration period T is 20 milliseconds. In these embodiments, the desired code frequency is calculated by dividing the number of chips by delta time as seen in Equation (31) below.

$$f_c = \frac{1.023 \times 10^6 T - \theta_{c_k}}{\hat{t}_{r_{k+1}} - t_{r_k}} \qquad 31$$

In some embodiments, the CA code chip transition does not happen on a whole sample from the front end, therefore the current code phase, $\theta_{c_k}$, is subtracted from the total number of chips integration period (20 milliseconds in some embodiments).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

We claim:

1. A method for navigating a mobile object according to signals from satellites, the method comprising:

at a mobile object,
receiving satellite navigation signals from a plurality of satellites;
receiving base data from a stationary base station;

generating, from the received satellite navigation signals, satellite navigation data for the mobile object, the satellite navigation data for the mobile object including code phase estimates and carrier phase estimates for the plurality of satellites, wherein the mobile object comprises a system that includes a first receiver;

in accordance with the code phase estimates and carrier phase estimates, computing position, velocity and time estimates for the mobile object; and performing a navigation function for the mobile object in accordance with the computed position, velocity and time estimates for the mobile object;

wherein the mobile object includes a plurality of channels configured to track signals received by the mobile object from a corresponding number of satellites, each channel associated with a respective satellite;

generating code phase estimates for the plurality of satellites includes performing a Vector Delay Locked Loop (VDLL) computation process that drives, with signal updates, a code NCO (numerically controlled oscillator) for each channel of the plurality of channels; and generating carrier phase estimates for the plurality of satellites includes performing a Real-Time-Kinematics Vector Phase Locked Loop (RTK-VPLL) computation process that drives, with signal updates, a carrier NCO (numerically controlled oscillator) for each channel of the plurality of channels.

2. The method of claim 1, wherein the base data received from the stationary base station includes, for each channel of the plurality of channels, a base station carrier phase measurement and base station Doppler frequency information for the satellite corresponding to the channel, and performing the RTK-VPLL computation process includes:

determining a relative navigation solution; and for each channel of the plurality of channels:
receiving phase discriminator data for the channel;
in accordance with the phase discriminator data for the channel, the base station carrier phase measurement and the base station Doppler frequency information for the satellite corresponding to the channel, and the relative navigation solution, calculating a carrier frequency setting; and
in accordance with the calculated carrier frequency setting, updating a respective Carrier NCO for the channel.

3. The method of claim 1, wherein the base data received from the stationary base station includes, satellite measurement data of the stationary base station, the satellite measurement data of the stationary base station including base station code phase measurements and base station carrier phase measurements for the plurality of satellites, Doppler frequency information, and position-related information of the stationary base station; and performing the RTK-VPLL computation process includes:

receiving phase discriminator data from the plurality of channels;

in accordance with the phase discriminator data for the mobile object and the received base data, determining a relative navigation solution comprising RTK-VPLL state estimates; and for each channel of the plurality of channels:
in accordance with the relative navigation solution, the received base station carrier phase measurements, and the received Doppler frequency information, calculating a carrier frequency setting for the channel;
in accordance with the calculated carrier frequency setting, updating a respective Carrier NCO for the channel.

4. The method of claim 3, wherein determining the RTK-VPLL state estimates includes calculating relative position estimates of the mobile object relative to the stationary base station using a Kalman filter.

5. The method of claim 4, wherein calculating the relative position estimates using the Kalman filter includes determining a state vector that incorporates clock bias and clock drift of a clock of the mobile object.

6. The method of claim 5, wherein the clock bias and the clock drift are computed, by the mobile object, relative to a clock of the stationary base station.

7. The method of claim 4, wherein determining the RTK-VPLL state estimates includes calculating an initial position of the mobile object relative to the stationary base station using a Real-Time-Kinematics (RTK) algorithm, and wherein the RTK algorithm includes:

receiving code phase estimates and carrier phase estimates from the plurality of channels; and in accordance with the position-related information of the stationary base station and the received code phase estimates and carrier phase estimates, estimating the initial position of the mobile object relative to the stationary base station.

8. The method of claim 7, wherein determining the RTK-VPLL state estimates further includes estimating an initial relative velocity and an initial relative clock state using the Kalman filter.

9. The method of claim 7, wherein the RTK algorithm further includes calculating a vector of fixed integer single difference carrier ambiguities.

10. The method of claim 4, wherein receiving the phase discriminator data from the plurality of channels further includes performing a cycle slip check, the cycle slip check including:

identifying a cycle slip in a subset of the channels in the plurality of channels; and removing phase discriminator data corresponding to the subset of the channels from the received phase discriminator data used by the Kalman filter to update the relative position estimates of the mobile object.

11. The method of claim 3, wherein determining the RTK-VPLL state estimates further includes estimating an initial position of the mobile object relative to the stationary base station using a scalar Phase Locked Loop (PLL) filter.

12. The method of claim 3, wherein performing the RTK-VPLL computation process includes:

determining if respective residual values of the RTK-VPLL state estimates meet fault detection criteria, and excluding, from updating the respective Carrier Numerically Controlled Oscillator, each of the respective residual values of the RTK-VPLL state estimates that meet the fault detection criteria.

13. The method of claim 1, wherein performing the VDLL computation process includes:

determining a global navigation solution;

receiving code discriminator data from the plurality of channels associated with the plurality of satellites and receiving corresponding Doppler frequency information for each of the plurality of channels; and in accordance with the received code discriminator data, the received Doppler frequency information, and the global navigation solution, updating a respective Code Numerically Controlled Oscillator for a respective channel in the plurality of channels.

14. A navigation module for a mobile object, comprising:
one or more processors;
a satellite receiver to receive satellite navigation signals from a plurality of satellites;
a second receiver for receiving base data from a stationary base station;
a plurality of channels including a respective channel for each of the satellites in the plurality of satellites, each respective channel in the plurality of channels including a code locked loop to generate a local code navigation solution and a phase locked loop to generate a local carrier navigation solution, the code locked loop including a code discriminator and a code NCO (numerically controlled oscillator), and the phase locked loop including a carrier discriminator, a phase predictor and a carrier NCO;
memory storing a VDLL navigation module and a RTK-VPLL navigation module to be executed by the one or more processors, the VDLL navigation module to perform a VDLL computation process to generate code phase estimates for the plurality of satellites and drive, with signal updates, the code NCO for each channel of the plurality of channels, and the RTK-VPLL navigation module to perform a RTK-VPLL computation process to generate carrier phase estimates for the plurality of satellites and drive, with signal updates, the carrier NCO for each channel of the plurality of channels; and
a navigation application module, executed by the one or more processors, the navigation application module to perform a navigation function for the mobile object in accordance with position and velocity estimates for the mobile object determined in accordance with at least the carrier phase estimates for the plurality of satellites.

15. The navigation module of claim 14, wherein the base data received from the stationary base station includes, for each channel of the plurality of channels, a base station carrier phase measurement and base station Doppler frequency information for the satellite corresponding to the channel, and performing the RTK-VPLL computation process includes:
determining a relative navigation solution; and
for each channel of the plurality of channels:
receiving phase discriminator data for the channel;
in accordance with the phase discriminator data for the channel, the base station carrier phase measurement and the base station Doppler frequency information for the satellite corresponding to the channel, and the relative navigation solution, calculating a carrier frequency setting;
in accordance with the calculated carrier frequency setting, updating a respective Carrier NCO for the channel.

16. The navigation module of claim 14, wherein
the base data received from the stationary base station includes, satellite measurement data of the stationary base station, the satellite measurement data of the stationary base station including base station code phase measurements and base station carrier phase measurements the plurality of satellites, Doppler frequency information, and position-related information of the stationary base station; and
performing the RTK-VPLL computation process includes:
receiving phase discriminator data from the plurality of channels;
in accordance with the phase discriminator data for the mobile object and the received base data, determining a relative navigation solution comprising RTK-VPLL state estimates; and
for each channel of the plurality of channels:
in accordance with the relative navigation solution, the received base station carrier phase measurements, and the received Doppler frequency information, calculating a carrier frequency setting for the channel;
in accordance with the calculated carrier frequency setting, updating a respective Carrier NCO for the channel.

17. The navigation module of claim 16, wherein determining the RTK-VPLL state estimates includes calculating relative position estimates of the mobile object relative to the stationary base station using a Kalman filter.

18. The navigation module of claim 17, wherein calculating the relative position estimates using the Kalman filter includes determining a state vector that incorporates clock bias and clock drift of a clock of the mobile object.

19. The navigation module of claim 18, wherein the clock bias and the clock drift are computed, by the mobile object, relative to a clock of the stationary base station.

20. The navigation module of claim 17, wherein determining the RTK-YPLL state estimates includes calculating an initial position of the mobile object relative to the stationary base station using a Real-Time-Kinematics (RTK) algorithm, and wherein the RTK algorithm includes:
receiving code phase estimates and carrier phase estimates from the plurality of channels; and
in accordance with the position-related information of the stationary base station and the received code phase estimates and carrier phase estimates, estimating the initial position of the mobile object relative to the stationary base station.

21. The navigation module of claim 20, wherein determining the RTK-YPLL state estimates further includes estimating an initial relative velocity and an initial relative clock state using the Kalman filter.

22. The navigation module of claim 20, wherein the RTK algorithm further includes calculating a vector of fixed integer single difference carrier ambiguities.

23. The navigation module of claim 17, wherein receiving the phase discriminator data from the plurality of channels further includes performing a cycle slip check, the cycle slip check including:
identifying a cycle slip in a subset of the channels in the plurality of channels; and
removing phase discriminator data corresponding to the subset of the channels from the received phase discriminator data used by the Kalman filter to update the relative position estimates of the mobile object.

24. The navigation module of claim 16, wherein determining the RTK-VPLL state estimates further includes estimating an initial position of the mobile object relative to the stationary base station using a scalar Phase Locked Loop (PLL) filter.

25. The navigation module of claim 16, wherein performing the RTK-VPLL computation process includes:
determining if respective residual values of the RTK-VPLL state estimates meet fault detection criteria, and excluding, from updating the respective Carrier Numerically Controlled Oscillator, each of the respective residual values of the RTK-VPLL state estimates that meet the fault detection criteria.

26. The navigation module of claim 14, wherein performing the VDLL computation process includes:
   determining a global navigation solution;
   receiving code discriminator data from the plurality of channels associated with the plurality of satellites and receiving corresponding Doppler frequency information for each of the plurality of channels; and
   in accordance with the received code discriminator data, the received Doppler frequency information, and the global navigation solution, updating a respective Code Numerically Controlled Oscillator for a respective channel in the plurality of channels.

27. A non-transitory computer readable storage medium storing one or more programs, the one or more programs including instructions that, when executed by one or more processors of a system for navigating a mobile object according to signals from a plurality of satellites, perform a method comprising:
   receiving satellite navigation signals from the plurality of satellites;
   receiving base data from a stationary base station;
   generating, from the received satellite navigation signals, satellite navigation data for the mobile object, the satellite navigation data for the mobile object including code phase estimates and carrier phase estimates for the plurality of satellites, wherein the mobile object comprises a system that includes a first receiver;
   in accordance with the code phase estimates and carrier phase estimates, computing position, velocity and time estimates for the mobile object; and
   performing a navigation function for the mobile object in accordance with the computed position, velocity and time estimates for the mobile object;
   wherein
   the mobile object includes a plurality of channels configured to track signals received by the mobile object from a corresponding number of satellites, each channel associated with a respective satellite;
   generating code phase estimates for the plurality of satellites includes performing a Vector Delay Locked Loop (VDLL) computation process that drives, with signal updates, a code NCO (numerically controlled oscillator) for each channel of the plurality of channels; and
   generating carrier phase estimates for the plurality of satellites includes performing a Real-Time-Kinematics Vector Phase Locked Loop (RTK-VPLL) computation process that drives, with signal updates, a carrier NCO (numerically controlled oscillator) for each channel of the plurality of channels.

28. The non-transitory computer readable storage medium of claim 27, wherein the base data received from the stationary base station includes, for each channel of the plurality of channels, a base station carrier phase measurement and base station Doppler frequency information for the satellite corresponding to the channel, and performing the RTK-VPLL computation process includes:
   determining a relative navigation solution; and
   for each channel of the plurality of channels:
      receiving phase discriminator data for the channel;
      in accordance with the phase discriminator data for the channel, the base station carrier phase measurement and the base station Doppler frequency information for the satellite corresponding to the channel, and the relative navigation solution, calculating a carrier frequency setting;
      in accordance with the calculated carrier frequency setting, updating a respective Carrier NCO for the channel.

29. The non-transitory computer readable storage medium of claim 27, wherein
   the base data received from the stationary base station includes, satellite measurement data of the stationary base station, the satellite measurement data of the stationary base station including base station code phase measurements and base station carrier phase measurements the plurality of satellites, Doppler frequency information, and position-related information of the stationary base station; and
   performing the RTK-VPLL computation process includes:
      receiving phase discriminator data from the plurality of channels;
      in accordance with the phase discriminator data for the mobile object and the received base data, determining a relative navigation solution comprising RTK-VPLL state estimates; and
      for each channel of the plurality of channels:
         in accordance with the relative navigation solution, the received base station carrier phase measurements, and the received Doppler frequency information, calculating a carrier frequency setting for the channel;
         in accordance with the calculated carrier frequency setting, updating a respective Carrier NCO for the channel.

30. The non-transitory computer readable storage medium of claim 29, wherein determining the RTK-VPLL state estimates includes calculating relative position estimates of the mobile object relative to the stationary base station using a Kalman filter.

31. The non-transitory computer readable storage medium of claim 30, wherein calculating the relative position estimates using the Kalman filter includes determining a state vector that incorporates clock bias and clock drift of a clock of the mobile object.

32. The non-transitory computer readable storage medium of claim 31, wherein the clock bias and the clock drift are computed, by the mobile object, relative to a clock of the stationary base station.

\* \* \* \* \*